US011968774B2

(12) United States Patent
Park, Jr. et al.

(10) Patent No.: US 11,968,774 B2
(45) Date of Patent: Apr. 23, 2024

(54) COMPACT MOTOR-DRIVEN INSULATED ELECTROSTATIC PARTICLE ACCELERATOR

(71) Applicant: Neutron Therapeutics LLC, Danvers, MA (US)

(72) Inventors: William H. Park, Jr., Marblehead, MA (US); Theodore H. Smick, Gloucester, MA (US); Geoffrey Ryding, Manchester, MA (US); Ronald Horner, Boxborough, MA (US)

(73) Assignee: Neutron Therapeutics LLC, Danvers, MA (US)

(*) Notice: Subject to any disclaimer, the term of this patent is extended or adjusted under 35 U.S.C. 154(b) by 682 days.

(21) Appl. No.: 17/051,948

(22) PCT Filed: Apr. 19, 2019

(86) PCT No.: PCT/US2019/028291
§ 371 (c)(1),
(2) Date: Oct. 30, 2020

(87) PCT Pub. No.: WO2019/212766
PCT Pub. Date: Nov. 7, 2019

(65) Prior Publication Data

US 2021/0120660 A1 Apr. 22, 2021

Related U.S. Application Data

(60) Provisional application No. 62/664,313, filed on Apr. 30, 2018.

(51) Int. Cl.

| | |
|---|---|
| ***H05H 5/03*** | (2006.01) |
| ***H05H 5/04*** | (2006.01) |
| ***H05H 5/06*** | (2006.01) |

(52) U.S. Cl.
CPC ................ *H05H 5/03* (2013.01); *H05H 5/04* (2013.01); *H05H 5/06* (2013.01)

(58) Field of Classification Search
None
See application file for complete search history.

(56) References Cited

U.S. PATENT DOCUMENTS

| | | | |
|---|---|---|---|
| 4,016,499 | A | 4/1977 | Budker et al. |
| 4,912,421 | A | 3/1990 | Anderson |

(Continued)

FOREIGN PATENT DOCUMENTS

| | | |
|---|---|---|
| CN | 2354308 | 12/1999 |
| CN | 102440080 | 5/2012 |

(Continued)

OTHER PUBLICATIONS

Notice of Allowance for Taiwanese Patent Application No. 108114592, dated Aug. 30, 2023, 3 pages.

(Continued)

*Primary Examiner* — Anh Q Tran
(74) *Attorney, Agent, or Firm* — DLA PIPER LLP (US)

(57) ABSTRACT

According to some embodiments, an electrostatic particle accelerator may include an assembly having a motor and support plate; an acceleration tube; one or more stage assemblies each having an alternator coupled to a common drive shaft, a power supply coupled to one of the plurality of electrodes, and an opening to receive a portion of the acceleration tube; a pressure vessel configured to enclose the acceleration tube when the pressure vessel is fastened to the support plate; and a circulator configured to pump high pressure gas into the pressure vessel. The acceleration tube can include an ion source, an extraction assembly, and a (Continued)

plurality of tube segments each having a plurality of electrodes and one or more power connectors attached to one of the electrodes.

10 Claims, 21 Drawing Sheets

(56) References Cited

U.S. PATENT DOCUMENTS

| | | | | |
|---|---|---|---|---|
| 5,463,268 | A * | 10/1995 | Schroeder | H01J 37/09 313/313 |
| 8,558,486 | B2 | 10/2013 | Smick et al. | |
| 8,836,247 | B2 | 9/2014 | Yamamoto et al. | |
| 9,807,864 | B1 | 10/2017 | Lupoli et al. | |
| 2010/0033115 | A1* | 2/2010 | Cleland | H05H 5/00 315/501 |
| 2012/0146554 | A1* | 6/2012 | Smick | H05H 5/04 310/112 |

FOREIGN PATENT DOCUMENTS

| | | | |
|---|---|---|---|
| CN | 103108484 | | 5/2013 |
| CN | 103578847 | | 2/2014 |
| JP | H02298900 | A | 12/1990 |
| JP | H05266994 | | 10/1993 |
| JP | H06196296 | A | 7/1994 |
| JP | 2005214908 | A | 8/2005 |
| JP | 2007026816 | A | 2/2007 |
| JP | 2013545255 | A | 12/2013 |
| KR | 10-2013-0124346 | | 11/2013 |
| WO | 03/080126 | | 10/2003 |

OTHER PUBLICATIONS

Office Action for Chinese Patent Application No. 201980029212.3, dated Jul. 31, 2023, 5 pages.

Kreiner, et al., "A Tandem-electrostatic-quadrupole for accelerator-based BNCT," Nuclear Instruments and Methods in Physics Research Section B: Beam Interactions with Materials and Atoms 261.1-2, 2007, pp. 751-754.

Kreiner, et al., "Development of a tandem-electrostatic-quadrupole accelerator facility for BNCT," Applied Radiation and isotopes 67.7-8, 2009, pp. S266-S269.

International Preliminary Report on Patentability for International Application No. PCT/US2019/028291, dated Nov. 12, 2020, 12 Pages.

International Search Report and Written Opinion for International Application No. PCT/US2019/028291, dated Sep. 2, 2019, 16 Pages.

Office Action for Japanese Patent Application No. 20200558566, dated Mar. 7, 2023, 4 Pages.

Office Action and Search Report from Taiwan Patent Application No. 108114592, dated Apr. 25, 2023, 4 pages.

Office Action for Japanese Patent Application No. 20200558566, dated Jun. 20, 2023, 4 pages.

Ryding, et al., "A 1.2 MeV, 100 mA proton implanter", http://www.neutrontherapeutics.com/wp-content/uploads/Twin-Creek-Technologies-Hyperion-Proton-Implanter.pdf, 2012, 13 pages.

Kreiner, et al., "Tandem—ESQ for Accelerator—Based Boron Neutron Capture Therapy (AB-BNCT)", AIP Conference Proceedings. vol. 884. No. 1. American Institute of Physics, Feb. 22, 2007, 18 pages.

Okamura, et al., "Performance of the low charge state laser ion source in BNL", Proceedings of the HIAT 2015, Feb. 1, 2016, 5 pages.

Office Action from New Zealand Patent Application No. 768892, dated Dec. 13, 2023, 4 pages.

Office Action from Korean Patent Application No. 10-2020-7031289, dated Nov. 18, 2023, 5 pages.

Notice of Allowance for Chinese Patent Application No. 201980029212.3, dated Feb. 28, 2024, 7 pages.

* cited by examiner

COMPACT MOTOR-DRIVEN INSULATED ELECTROSTATIC PARTICLE ACCELERATOR

CROSS-REFERENCE TO RELATED APPLICATIONS

This application is a National Stage of PCT/US2019/028291, filed Apr. 19, 2019, which claims the benefit of U.S. Provisional Patent Application No. 62/664,313, filed Apr. 30, 2018, which are incorporated by reference in their entireties.

BACKGROUND

Electrostatic particle accelerators have various applications including particle therapy for cancer treatment. In hospitals and other settings, it may be preferable for an accelerator to be compact while generating an ion beam having a relatively high energy, high current, and good stability. Particle accelerators can experience electrical breakdown in gases and solids. To prevent such breakdown, a particle accelerator may be operated within a pressure vessel pumped full of an insulating gas, such as sulfur hexafluoride (SF6).

SUMMARY

According to one aspect, the present disclosure relates to an electrostatic particle accelerator including: an assembly including a motor and support plate; and an acceleration tube. The acceleration tube can include an ion source, an extraction assembly, and a plurality of tube segments each including a plurality of electrodes and one or more power connectors attached to one of the electrodes. The particle acceleratory can further include one or more stage assemblies each including an alternator coupled to a common drive shaft, a power supply coupled to one of the plurality of electrodes, and an opening to receive a portion of the acceleration tube; a pressure vessel configured to enclose the acceleration tube when the pressure vessel is fastened to the support plate; and a circulator configured to pump high pressure gas into the pressure vessel. The motor can be external to the pressure vessel and magnetically coupled to the common drive shaft.

In some embodiments, at least one of the tube segments can include at least N electrodes and less than N stage assemblies. In some embodiments, at least one of the tube segments can include at least ten (10) electrodes and no more than two (2) stage assemblies. In some embodiments, at least one of the stage assemblies can include an axial flux alternator including integrated flex coupling with wrap-around carbon fiber brush grounding. In some embodiments, the acceleration tube can have an extraction assembly powered by the common drive shaft. In some embodiments, the circulator is powered by the common drive shaft. In some embodiments, the circulator can include a sulfur hexafluoride (SF6) circulator. In some embodiments, at least one of the stage assemblies can have a power supply that can be slide into the stage assembly and electrically connected to the stage assembly without using wires. In some embodiments, at least one of the stage assemblies an alternator and a power supply that can be electrically connected together without using cables. In some embodiments, adjacent ones of the stage assemblies can be connected together and spaced apart by insulators.

According to one aspect, the present disclosure relates to a high current ion acceleration tube including: an ion source, an extraction assembly, and a plurality of tube segments each including a plurality of electrodes and one or more power connectors attached to one of the electrodes. The electrodes can be fixedly attached together using an adhesive. The tube segments can be removably attached together using band clamps. At least one of the electrodes may include an aperture plate, a magnet assembly including a plurality of permanent magnets, and a magnet cover configured to enclose the magnet assembly in the aperture plate.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to a motor-driven insulated electrostatic particle accelerator that can operate at relatively high energy while maintaining good stability at high beam current. The accelerator can have a compact design, facilitating installation and operation within hospitals and other clinical settings. The accelerator can have a modular design to facilitate manufacture, assembly, and maintenance. The accelerator's tube may include a plurality of electrodes having relatively large apertures and varying configurations of permanent magnets to suppress secondary electrons. The electrodes may be powered, at intervals, by axially compact alternators coupled to a motor-driven shaft. Relatively low pressure gas may be fed into an ion source through the mass flow controller. At the ground end of the tube, the gas may be pumped out to prevent breakdown of the physical tube structures. The acceleration tube may be located and operated inside of a pressure vessel or chamber pumped full of an insulating gas, such as sulfur hexafluoride (SF6). The motor may be external to the pressure vessel and magnetically coupled to the drive shaft. The particle accelerator may include various safety mechanisms, such as an overpressure safety relief system. In some embodiments, the particle accelerator can have a compact design while generating an ion beam having an energy in the range of 1 to 5 MeV. In some embodiments, many or all parts of the accelerator can be serviced without no (or minimal) disassembly of the accelerator.

Figure 1:
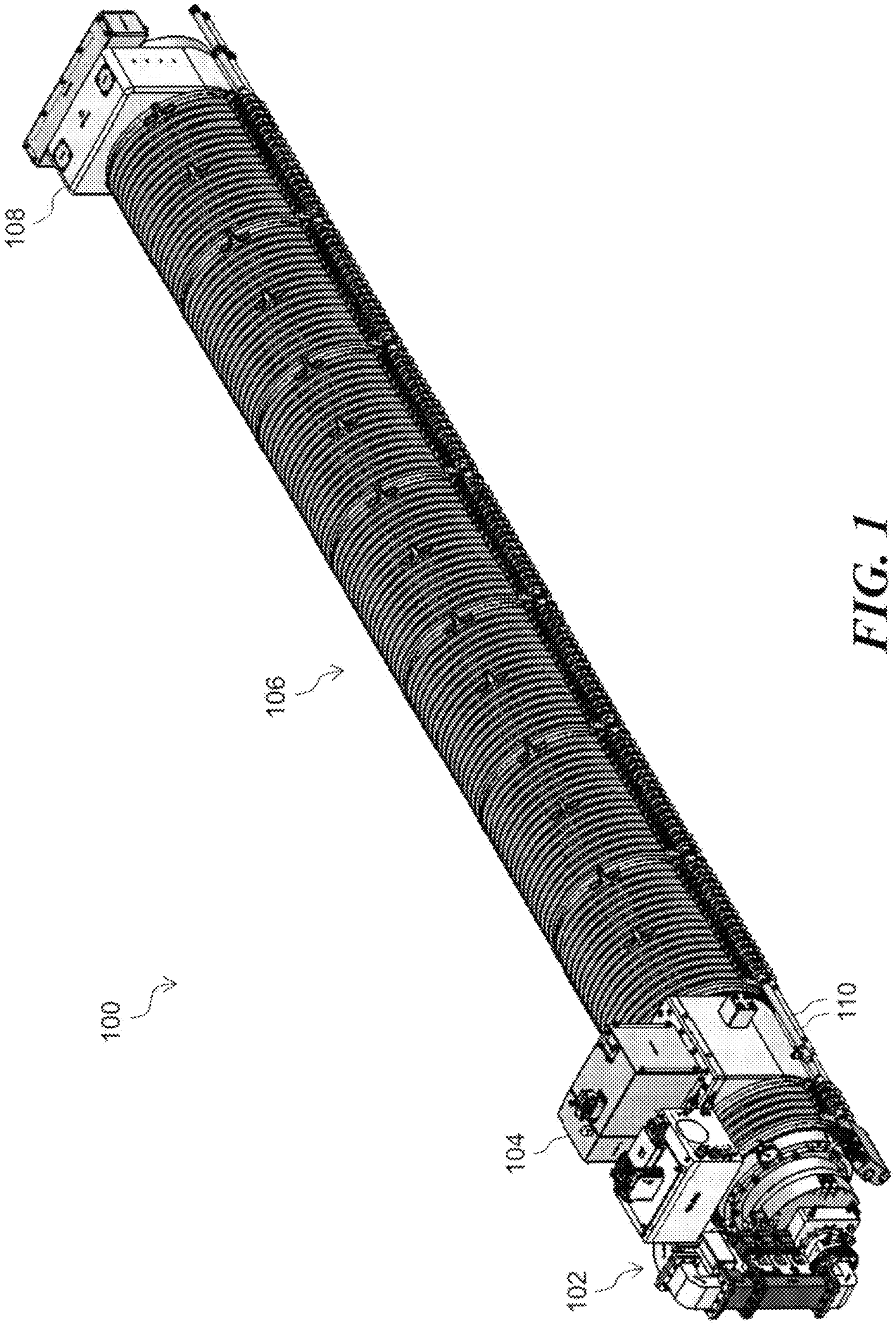
FIG. 1 is a perspective view of an acceleration tube, according to some embodiments of the present disclosure.
Figure 1A:
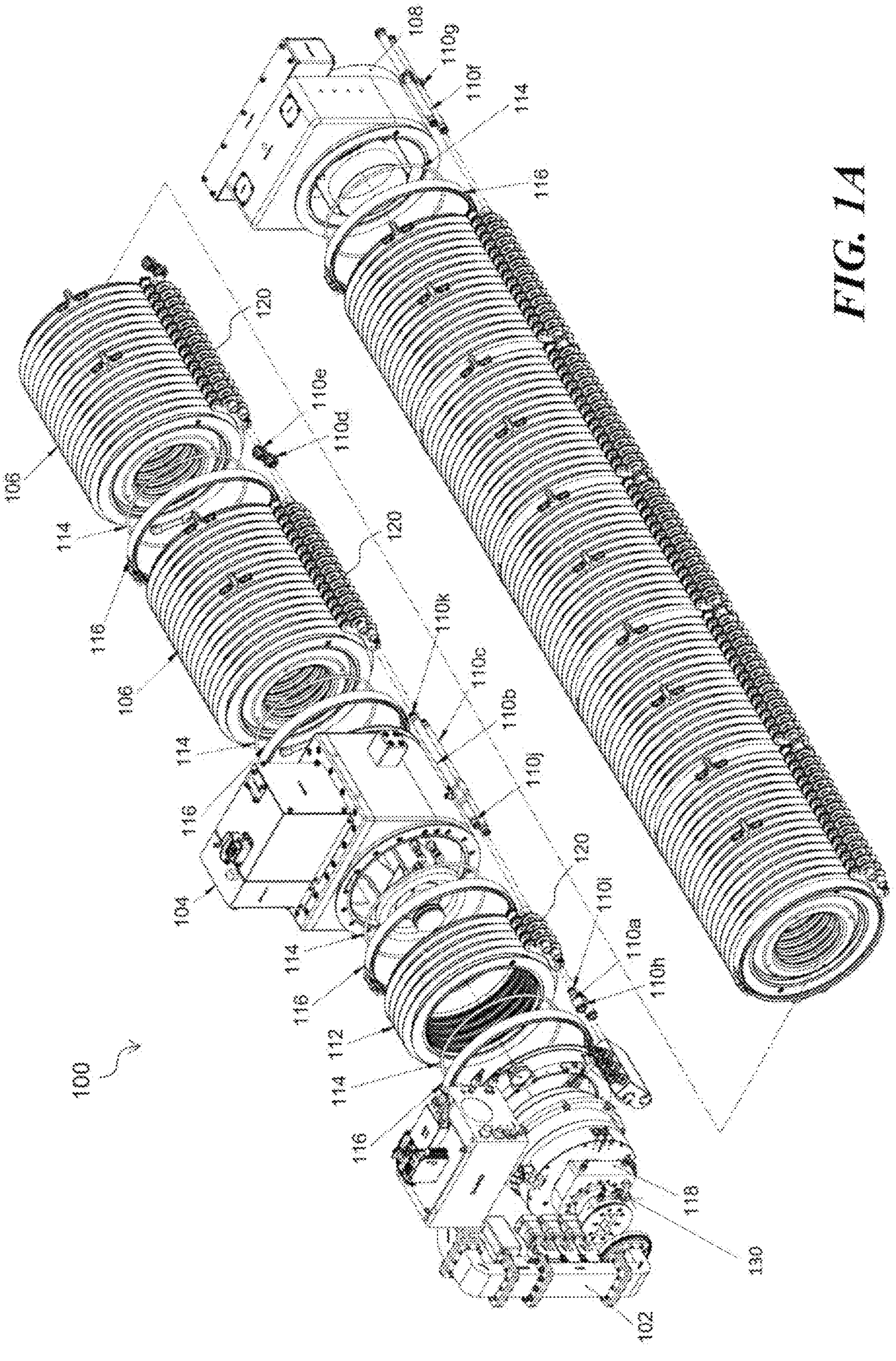
FIG. 1A is an exploded view of the acceleration tube of FIG. 1, according to some embodiments of the present disclosure.

FIGS. 1 and 1A show an acceleration tube 100 that can be used within a compact particle accelerator, according to some embodiments of the present disclosure. The tube 100 may include an energy source assembly (e.g., a microwave assembly) 102, an extraction assembly 104, a plurality of tube segments 106, a ground assembly 108, and water channels 110.

As seen in FIG. 1A, energy source assembly 102 and extraction assembly 104 may be connected by, and coupled to, a source tube 112. The source tube 112 may include one or more rings bonded together (e.g., using a bonding technique discussed below in conjunction with the tube segment 200 of FIG. 2). In some embodiments, the source tube 112 includes a plurality of stamped titanium rings.

Figure 2:
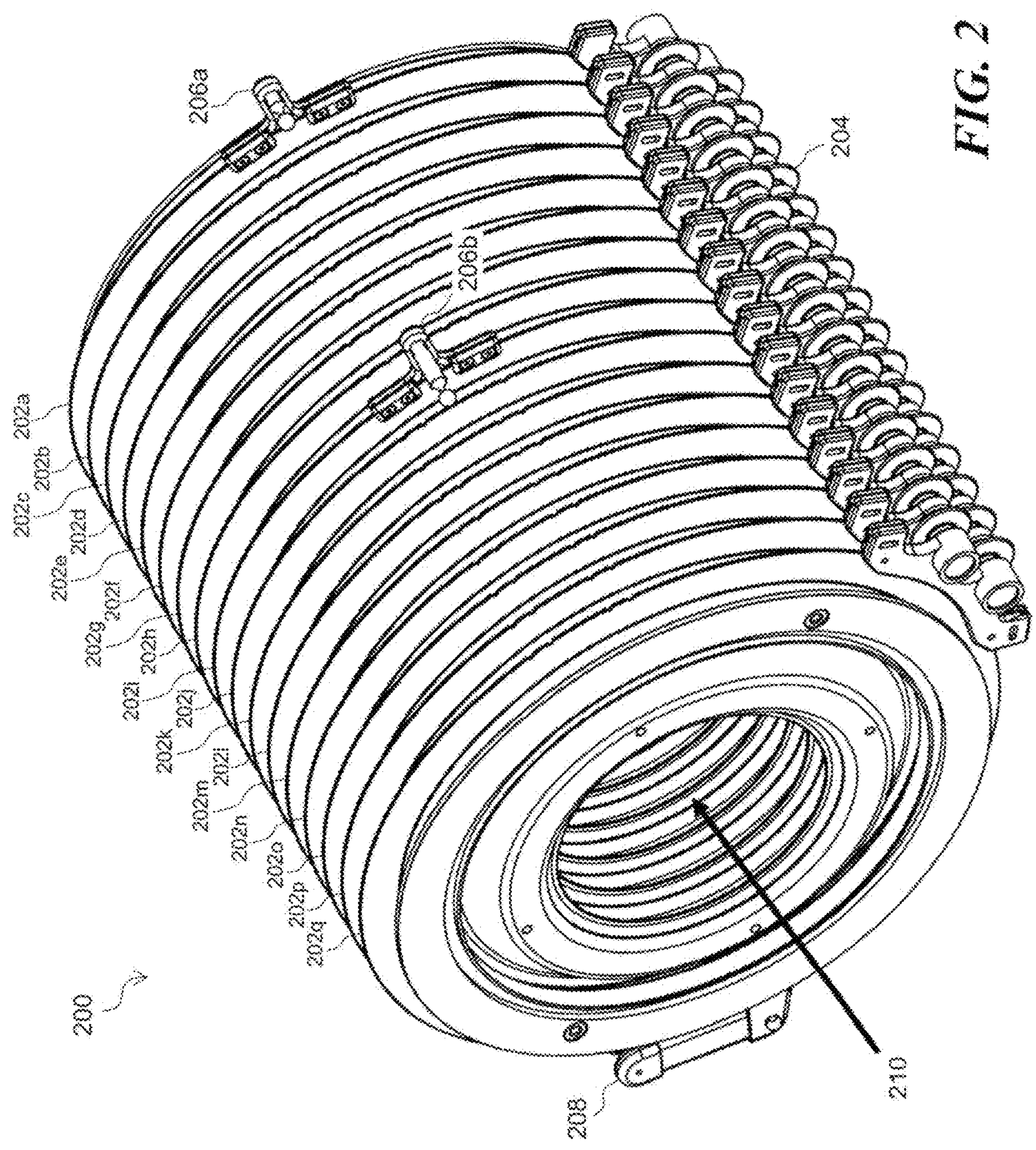
FIG. 2 is a perspective view of a tube segment that may form part of an acceleration tube segment, according to some embodiments of the present disclosure.

The tube segments 106 may be coupled together, with one end of the tube assembly coupled to the extraction assembly 104 and the opposite end coupled to the ground assembly 108. O-rings 114 and band clamps 116 can be used to couple the energy source assembly 102, source tube 112, extraction assembly 104, tube segments 106, and ground assembly 108, facilitating manufacture, assembly, and maintenance of the various tube components. An example of a tube segment is shown in FIG. 2 and discussed below in conjunction therewith.

The tube segments 106 can be removably attached together using, for example, band clamps. This modular design can provide several advantages. Each segment 106 can be manufactured separately while allowing the size of the overall tube 100 can be customized based on the number of segments. A modular design can also make service of the accelerator 100 easier because individual tube segments (and other components) can be removed, replaced, and repaired separately.

In the example of FIGS. 1 and 1A, the acceleration tube 100 can have seven (7) tube segments 106. One of ordinary skill in the art could build a tube with a larger or smaller number of tube segments, according to specific power/size/cost requirements or other factors. The length of the acceleration tube can be a function of a desired voltage gradient. In some embodiments, the length of the tube may be chosen to achieve an average voltage gradient in the range 0.8 to 2 MV/m.

Energy source assembly 102 can include, among other components, an ion source (e.g., a microwave ion source) 118 and a gas intake 130 to receive relatively low pressure gas (e.g., hydrogen) that is ionized to generate the beam. In some embodiments, the ion source 118 is operates using gas at around six (6) atmospheres. Pumps may be used to maintain a low vacuum pressure to avoid electrical breakdown on the inside of the tube. The extraction assembly 104 "extracts" the ion beam from the ion source. The ion source body 118 can generate a high density plasma primarily of singly charged hydrogen atoms and electrons. A negative field gradient between the extraction electrodes 104 and the source 118 pulls out the positive ions (H+) to create the beam.

Ground assembly 108 can provide electrostatic suppression of secondary ions (in addition to the permanent magnet system throughout the tube). The ground assembly 108 may also serve as a mechanical connection to the pressure vessel wall (such as vessel 604 of FIG. 6) and to terminate the accelerating field.

Figure 2A:
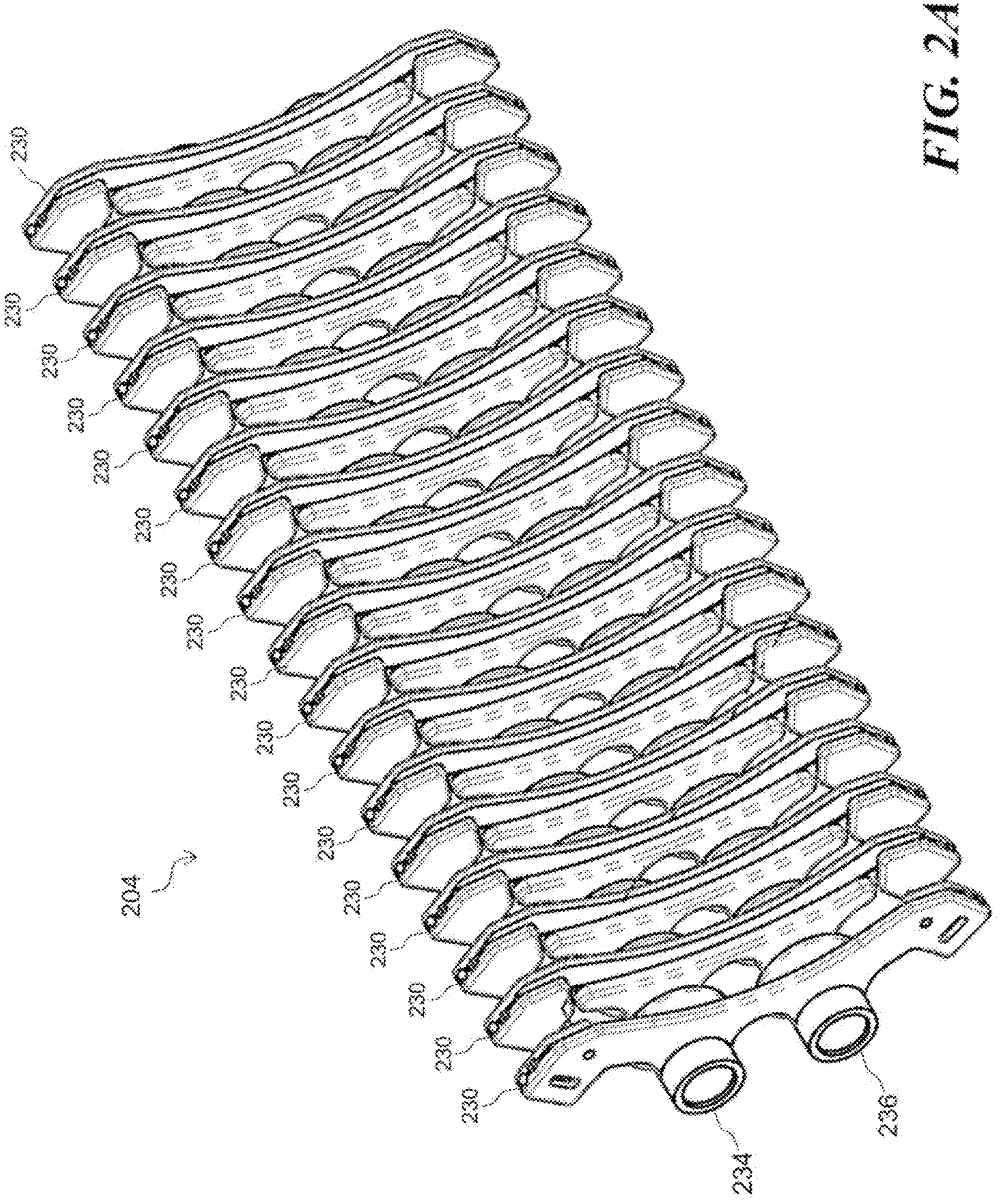
FIG. 2A is a perspective view of a water lines assembly that can form part of the tube segment of FIG. 2, according to some embodiments of the present disclosure.

Water channels 110 may include a supply line and a return line that extend generally parallel across the length of the tube 100. Water channels 110 may be used to circulate deionized water along the length of the acceleration tube 100. The water channels 110 may serve two purposes. First, the circulating water can cool elements in the ion source, such as solenoid magnets, magnetron, source body, extraction assembly. Second, water may electrically grade the electrodes (since the water acts as a high ohm resistor) to provide a voltage gradient across the length of the tube. The water lines may be formed from one or more connectors (e.g., connectors 110*a*, 110*b*, and 110*c*), one or more couplings (e.g., couplings 110*d*, 110*e*, 110*f*, and 110*g*), one or more O-rings (e.g., O-rings 110*h*, 110*i*, 110*j*, and 110*k*), and water lines assemblies 120 attached to each of the tube segments 106 and to the source tube 112. An example of a water line assembly is shown in FIG. 2A and discussed below in conjunction therewith.

FIG. 2 shows an acceleration tube segment 200, according to some embodiments of the present disclosure. The tube segment 200, which may be the same as or similar to a tube segment 106 in FIGS. 1 and 1A, can include a plurality of electrodes 202*a*, 202*b*, etc. (202 generally), a water lines assembly 204, one or more power connectors 206*a*, 206*b*, etc. (206 generally), and a resistor assembly 208. In the example of FIG. 2, the tube segment 200 can include seventeen (17) electrodes 202*a*-202*a*. One of ordinary skill in the art could build an acceleration tube segment with a larger or smaller number of electrodes, according to specific power/size/cost requirements or other factors.

Each of the electrodes 200 may have a circular or disk shape with a central aperture. The electrode apertures can be aligned along a central axis, defined in the drawing by line 210. The diameter of the aperture can be selected to allow transport of a high current beam with high charge density. A larger aperture can allow a larger diameter beam to be transported through the tube and a larger diameter beam of a given current reduces the space charge effect preventing beam "blowup". In addition, a large aperture can allow high conductance vacuum pumping to the ion source region. Examples of specific aperture dimensions are discussed below in the context of FIG. 3.

The electrodes 202 may be bonded together using an adhesive, such as a two-part epoxy or other glue. To prevent the adhesive from breaking during operation of the particle accelerator, the adhesive may be cured using a thermal process. The adhesive bond line thickness may be selected so that the resulting adhesive bond has a similar coefficient of expansion compared to that of the electrodes 202. The bond line thickness may also be selected to withstand the high temperatures within the tube during operation (if the adhesive is too thick, it may lose strength under high temperatures). In some embodiments, glass beads and/or fumed silica may be mixed with the adhesive to more accurately effect bond line thickness.

Power connectors (or "taps") 206 may be attached to one or more electrodes 202 and configured for coupling to power supply (not shown). As shown in FIG. 2, a tube segment 202 with approximately thirteen (13) electrodes 202 may have two (2) power connectors: a first connector 206*a* attached to an electrode 202*a* positioned at (or near) one end of the tube segment 200; and a second connector 206*b* attached to an electrode 202*i* positioned at (or near) the middle of the tube segment 200. The taps 206 connect the tube voltages to the corresponding power supply voltage at certain intervals, and water lines (e.g., water lines 110 in FIG. 1) can be used grade voltage between taps. One of ordinary skill in the art could build an acceleration tube segment with a larger or smaller number of power connectors, according to specific power/size/cost requirements or other factors.

Referring to FIG. 2A, water lines assembly 204 can include a plurality of segments 230 through which a first (or "supply") water line 234 and a second (or "return") water line 236 can extend. Each of the water line segments 230 may be configured to make contact with a corresponding electrode 202 to extract heat as water flows through the water lines 234, 236. The water line assembly 204 may be clamped to the tube segment in some embodiments.

Figure 2B:
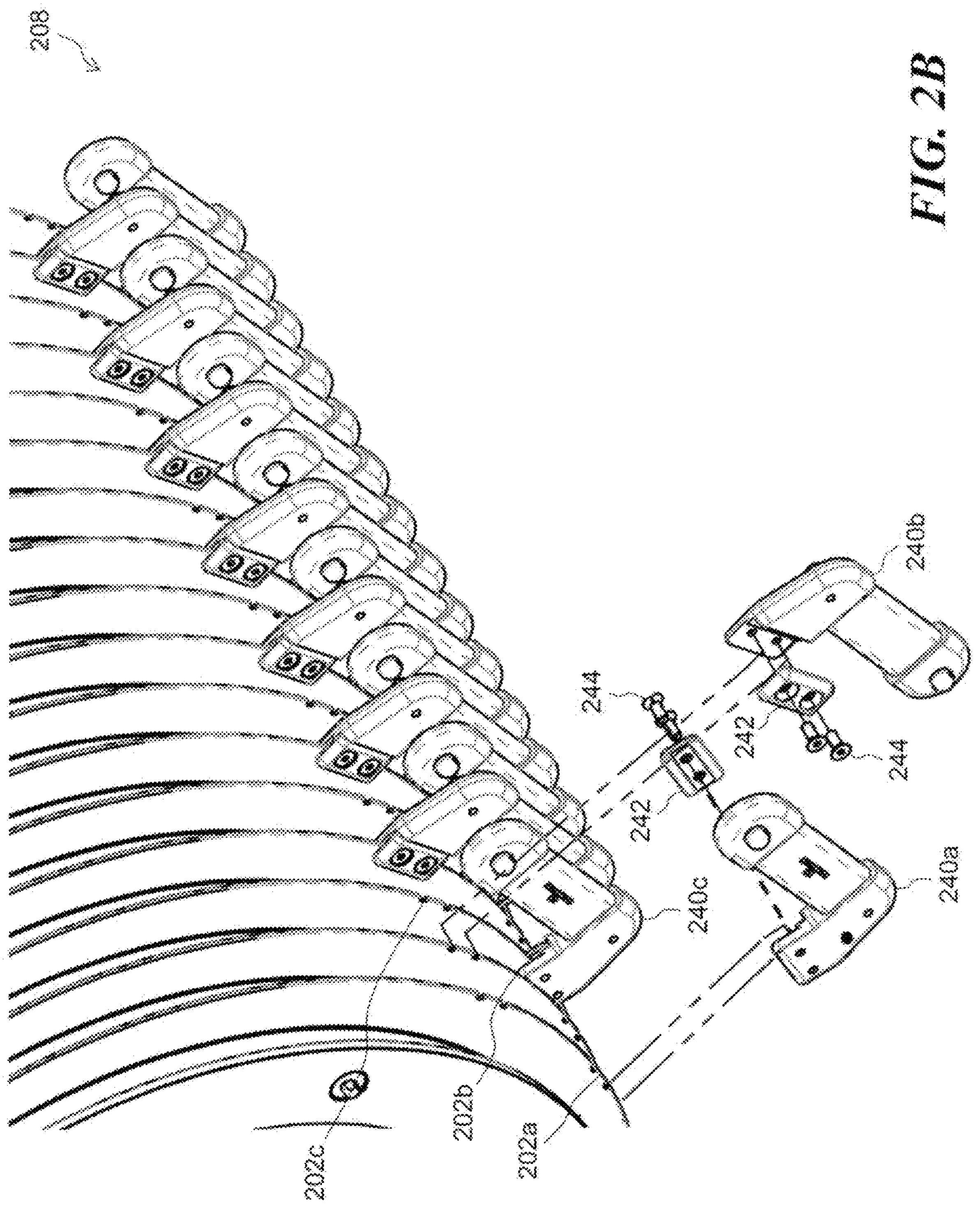
FIG. 2B is an exploded view of resistor assemblies that can form part of the tube segment of FIG. 2, according to some embodiments of the present disclosure.

Referring to FIG. 2B, resistor assembly 208 can include a plurality of resistor elements 240*a*, 240*b*, 240*c*, etc. (240 generally), each coupled to a corresponding one of the electrodes 202*a*, 202*b*, 202*c*, etc. As illustrated most clearly with resistor elements 240*a* and 240*b*, a resistor element 240 may be attached to a corresponding electrode 202 using a clamp 242 and screws 244. The resistor element 240 and clamp 242 can be positioned on opposite sides and along an edge of the electrode 202, and screwed together to fasten the resistor element 240 to the electrode 202. The resistor elements 240 may be arranged in two different configurations: a first (or "left hand") configuration illustrated by element 240*a*; and a second (or "right hand") configuration illustrated by element 240*b*. The left/right configurations may be alternated across tube segment electrodes, as illustrated in FIG. 2B. The resistors may form part of a spark gap system to limit overvoltages. A resistor gap may be precisely selected such that if the voltage across an insulator is too high, the spark gap will fire and protect the insulator from tracking damage. The resistor can limit surge current during the breakdown. In some embodiments, the resistors may include ceramic, the spark gaps may be formed from stainless steel, and the housings may be formed from aluminum.

Figure 2C:
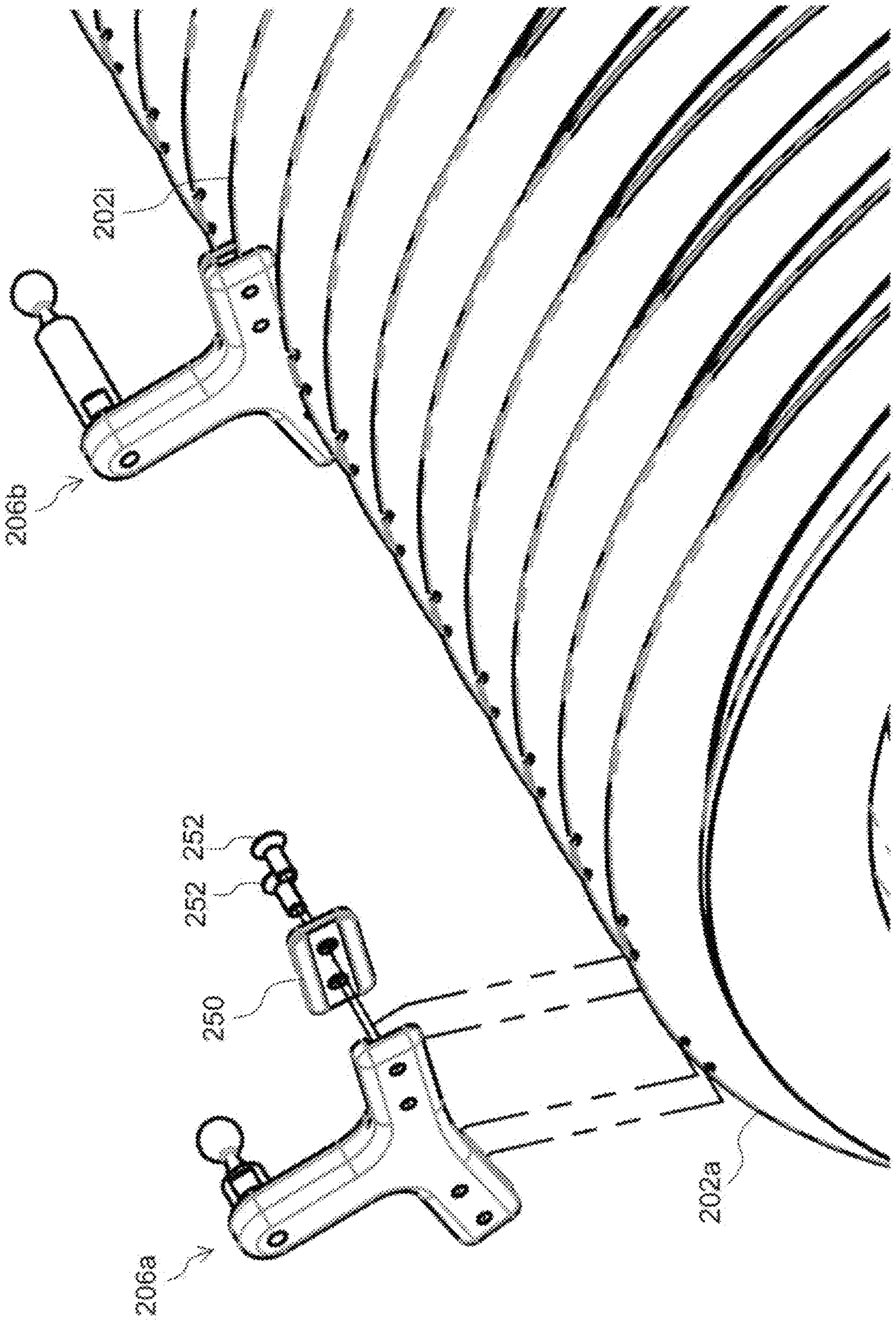
FIG. 2C is an exploded view of power connectors (or "taps") that can form part of the tube segment of FIG. 2, according to some embodiments of the present disclosure.

FIG. 2C illustrates how power connectors (or "taps") 206 can be attached to acceleration tube electrodes 202, according to some embodiments of the present disclosure. In this example, a first power connector 206*a* may be attached to electrode 202*a* positioned at (or near) one end of the tube segment, and a second connector 206*b* may be attached to electrode 202*i* positioned at (or near) the middle of the tube segment. As illustrated with the first connector 206*a*, a power connector 206 may be attached to an electrode 202 using a clamp 250 and screws 252. The connector 206 and clamp 250 can be positioned at opposite sides and along an edge of the electrode 202 and screwed together to fasten the connector 206 to the electrode 202. In some embodiments, the power connectors 206 may be machined out of titanium.

Figure 3:
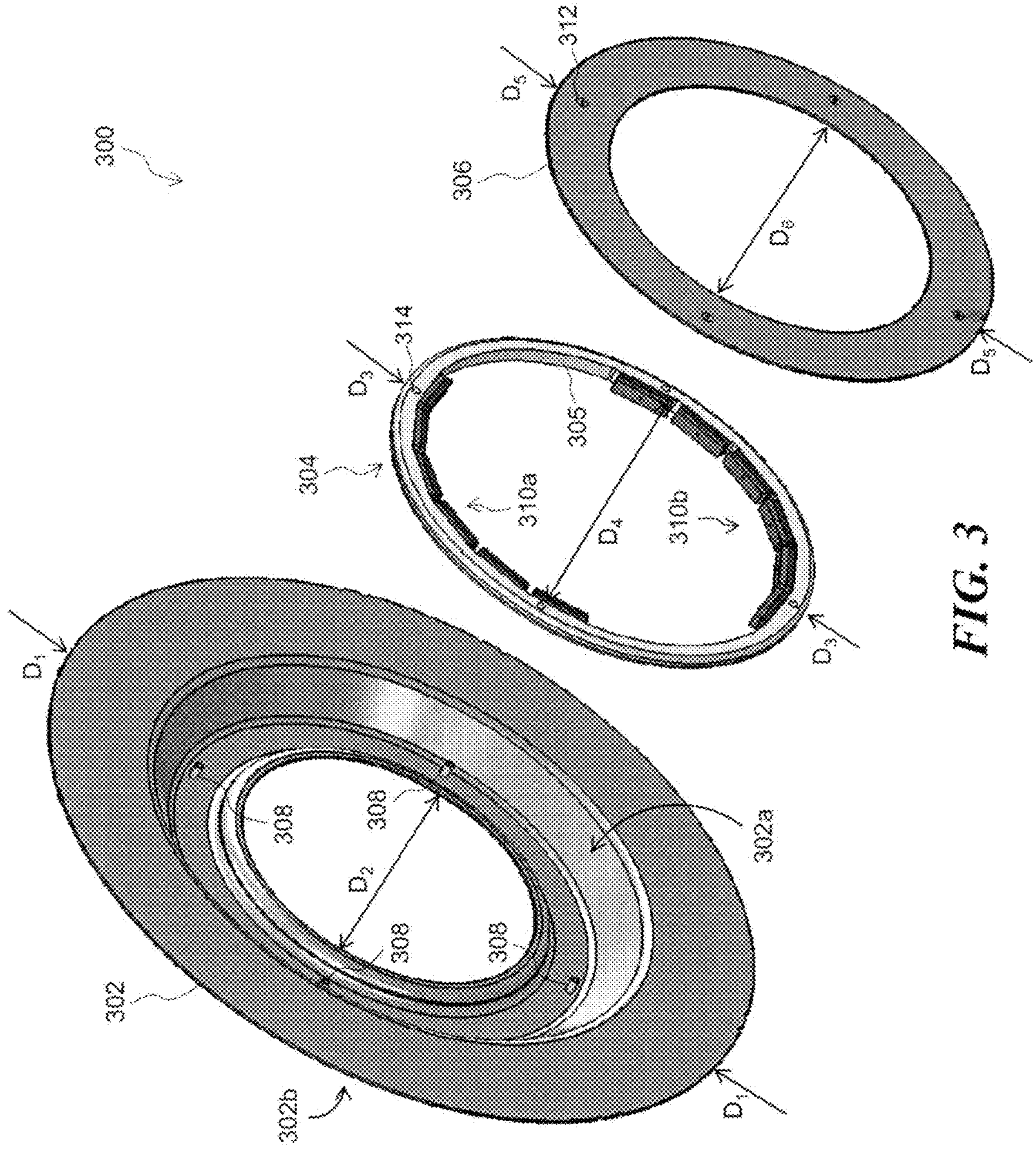
FIG. 3 is an exploded view of an electrode that can form part of an acceleration tube, according to some embodiments of the present disclosure.

FIG. 3 shows an electrode 300 that can form part of an acceleration tube (e.g., acceleration tube 100 of FIG. 1), according to some embodiments of the present disclosure. The illustrative electrode 300 can include an apertured plate 302, a magnet assembly 304, and a magnet cover 306.

The electrode plate 302 can have a concave (or "front") side 302*a* and a convex (or "back") side 302*b*. The plate 302 may include a plurality of threaded posts 308 (e.g., four (4) posts 408) configured to extend perpendicular from concave side 302*a* of the plate 302 and to receive screws. In some embodiments, electrode plate 302 can have an outer diameter $D_1$ of about 410 mm and an aperture diameter $D_2$ of about 170 mm. A skilled artisan will understand that these dimensions can be larger or smaller, depending on requirements. For example, the aperture diameter $D_2$ could be in the range 25 mm to 200 mm or greater.

The magnet assembly 304 may include a plurality of permanent magnets arranged along the inside of a circular support structure 305. For example, magnet assembly 304 can include a first row of magnets 310*a* arranged along a top side of support structure 305, and a second row of magnets 310*b* arranged along a bottom side of the support structure 305. In some embodiments, the first row 310*a* and/or the second row 310*b* of magnets can include six (6) magnets.

In some embodiments, each magnet in the magnet assembly 304 can have a substantially parallelepiped shape, with dimensions of about 8×8×32 mm. In some embodiments, spacing between two adjacent magnets (e.g., two adjacent magnets within the top row 310*a* or within the bottom row 310*b*) may about 5 mm. In some embodiments, the magnets may include samarium cobalt or neodymium iron boron. The magnets can be glued to the magnet assembly 304 using, for example, a thermal process.

The magnet assembly 304 can be sized and shaped to fit inside the concave portion of the plate 302 and can include a plurality of holes 314 each configured to receive a corresponding one of the plate posts 308. In some embodiments, the magnet assembly 304 can have an outer diameter $D_3$ of about 244 mm and an inner diameter $D_4$ of about 224 mm. In some embodiments, the magnet cover 306 can have an outer diameter $D_5$ of about 260 mm and an inner diameter $D_6$ of about 186 mm.

A person of ordinary skill in the art can select a magnet assembly configuration (e.g., number of magnets, magnet dimensions, magnet spacing, magnet material, and magnet assembly dimensions) in order to provide adequate suppression of secondary electrons. The required magnetic field strength can depend on the gradient of the tube, the aperture size, among other requirements.

The magnet cover 306 can be sized and shaped to fit over the magnet assembly 304 and inside the concave portion of the plate 302. The magnet cover 306 can include a plurality of screws 312 configured to fit through a corresponding one of the magnet assembly holes 314 and be threaded into a corresponding one of the posts 308, firmly securing the magnet assembly 314 and cover 306 into place. In some embodiments, the electrode plate 302 and magnet cover 306 may include titanium and be formed using a stamping process.

The number of magnets, the magnet sizes, the magnet positions, and the magnet orientations within a given electrode 300 may be selected such that, when the electrode 300 forms a part of an acceleration tube, the magnets function as a deflection yoke. In some embodiments, the magnets can be arranged to provide a uniform field across the electrode's aperture (increasing field uniformity can help prevent beam strike and plasma discharge). In some embodiments, an acceleration tube may include electrodes having five (5) different configurations, referred to herein as "empty," "up," "down," "left," and "right" configurations. In each of these electrode configurations, the same or similar plate 302 and magnet cover 306 may be used, whereas the magnet assembly 304 may differ. For electrodes having an "empty" configuration, the magnet assembly 304 may be omitted. For electrodes having an "up," "down", "left", or "right" configuration, the magnet assembly 304 can be included and the placement and orientation of the magnets therein may be varied, such as is shown FIGS. 4A-4D and discussed below therewith. Within an acceleration tube, a particular electrode magnet configuration can be used to effect a 90-degree deflection or "kick". By varying the electrode configurations across the length of the tube, the permanent magnets can suppress secondary electrons, helping to reduce beam strike and plasma discharge.

Figure 3A:
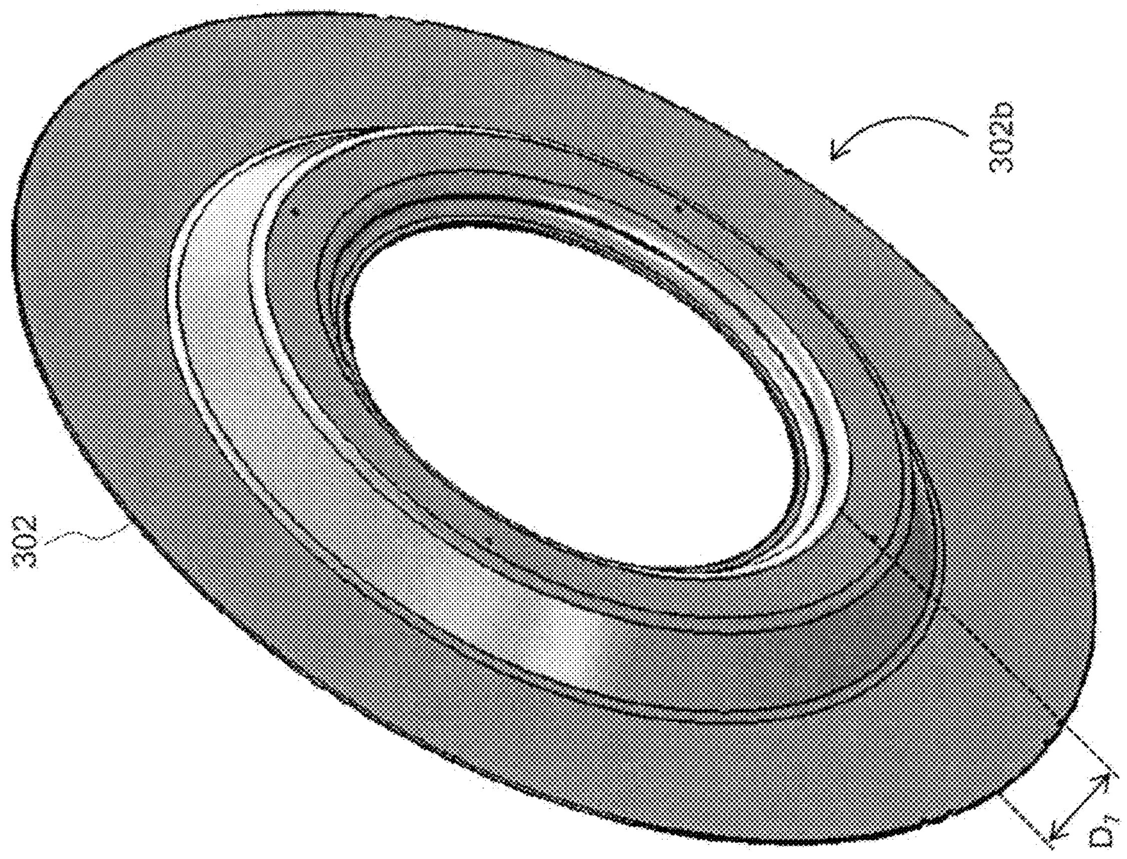
FIG. 3A is a perspective view showing a convex (or "back") side of an electrode plate that may form part of the electrode of FIG. 3, according to some embodiments of the present disclosure.

FIG. 3A shows the convex (or "back") side **302*b* of the electrode plate 302, according to some embodiments of the present disclosure. In some embodiments, the electrode plate 302** can have a thickness $D_7$ in the range of 0.5 mm to 5 mm.

FIGS. 4A, 4B, 4C, and 4D respectively show electrodes having "up," "down", "left", and "right" configurations, according to some embodiments of the present disclosure. Each of the electrodes can include an apertured plate 402 and a magnet assembly 404 having a plurality of magnets arranged around a circular or ring structure. The magnets can be arranged in a symmetric fashion around the magnet assembly 404 to form a dipole and to provide a uniform field across the electrode aperture. In each of these examples of FIGS. 4A-4D, the electrodes may be configured for use with an ion beam traveling out of the page. Also, the electrode magnet covers may be omitted for clarity in of FIGS. 4A-4D.

Figure 4B:
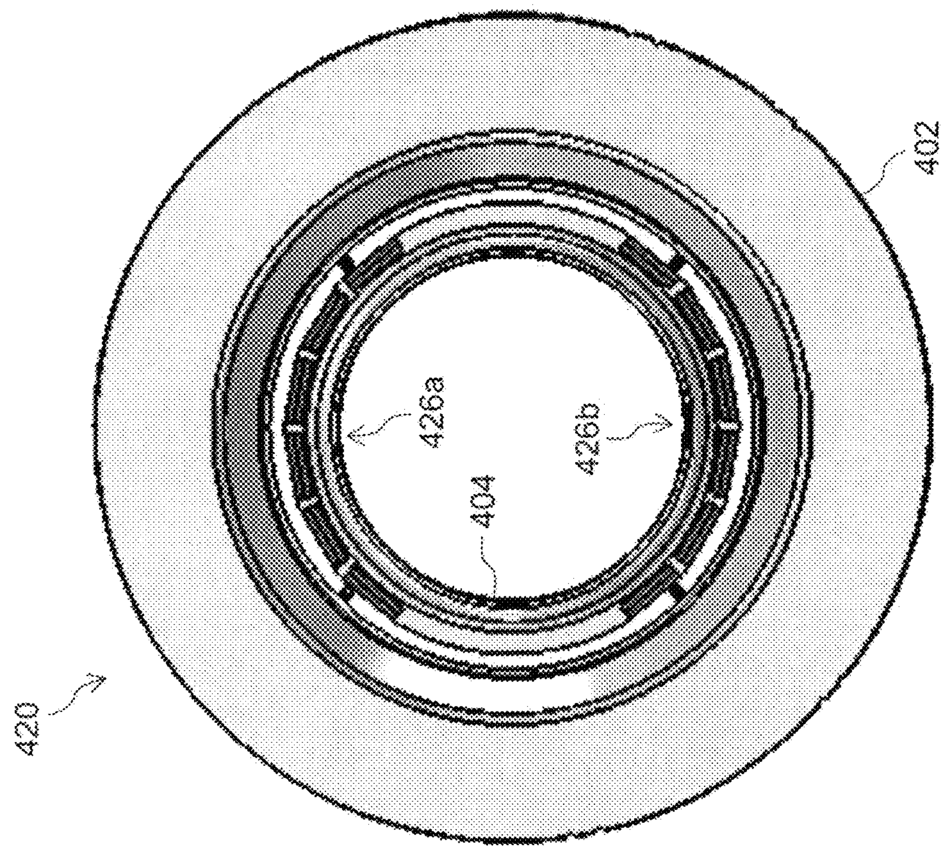
FIG. 4B is a front view of an electrode having a "down" configuration, according to some embodiments of the present disclosure.
Figure 4A:
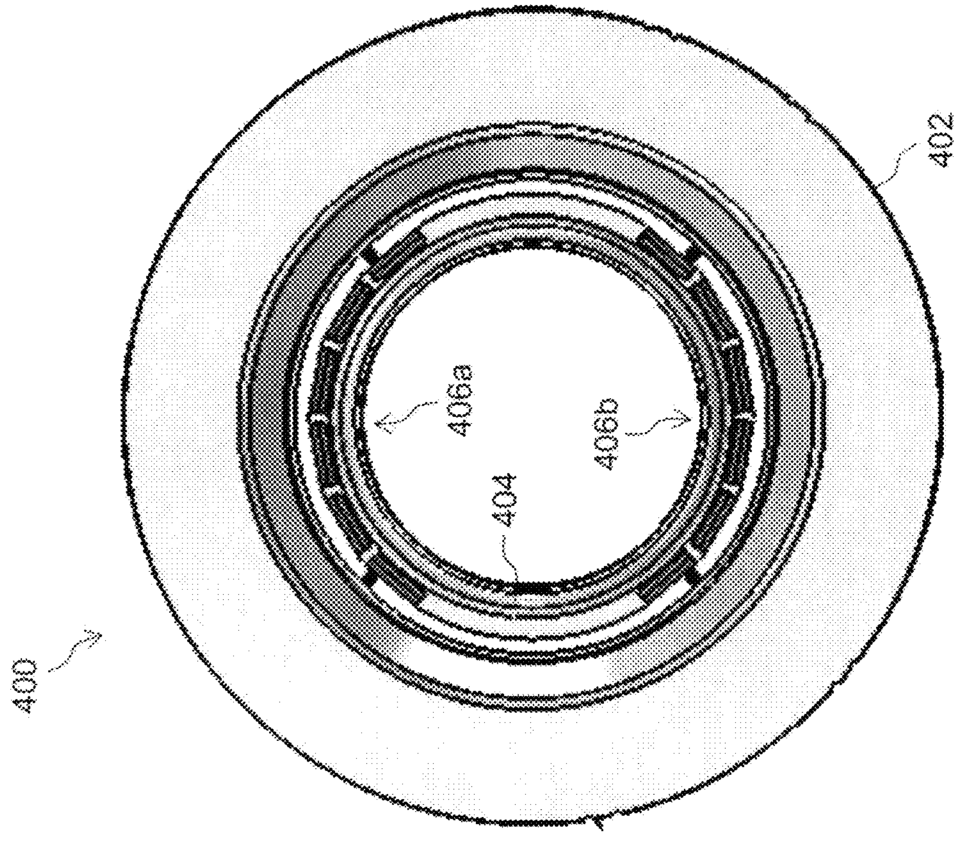
FIG. 4A is a front view of an electrode having an "up" configuration, according to some embodiments of the present disclosure.

Referring to FIG. 4A, an electrode 400 having an "up" configuration can include a first row of magnets **406*a* positioned along a top side of magnet assembly 404, and a second row of magnets 406*b* positioned along a bottom side of magnet assembly 404. Each of the magnets in the first row 406*a* and the second row 406*b* may have a north pole facing up (relative to the page). In some embodiments, the first and second rows 406*a*, 406*b*** may each have six (6) magnets.

Referring to FIG. 4B, an electrode 420 having an "down" configuration may be similar to the electrode shown in FIG. 4A except that each of the magnets in first row **426*a* and second row 426*b*** can have a north pole facing down (relative to the page).

Figure 4D:
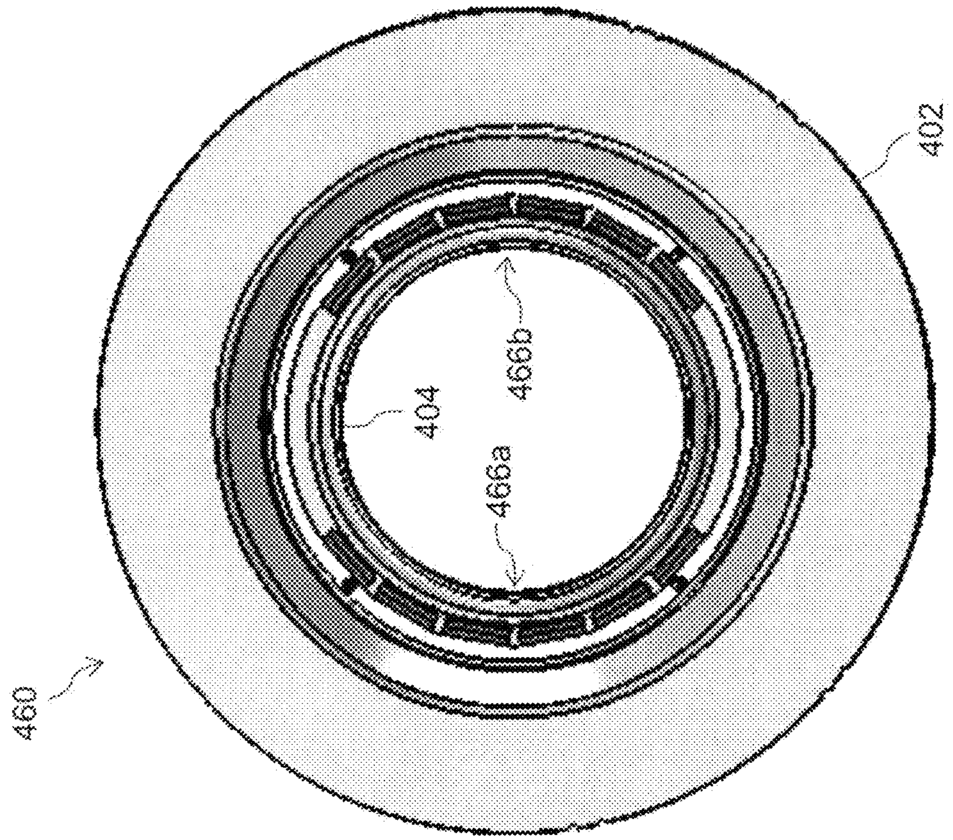
FIG. 4D is a front view of an electrode having a "right" configuration, according to some embodiments of the present disclosure.
Figure 4C:
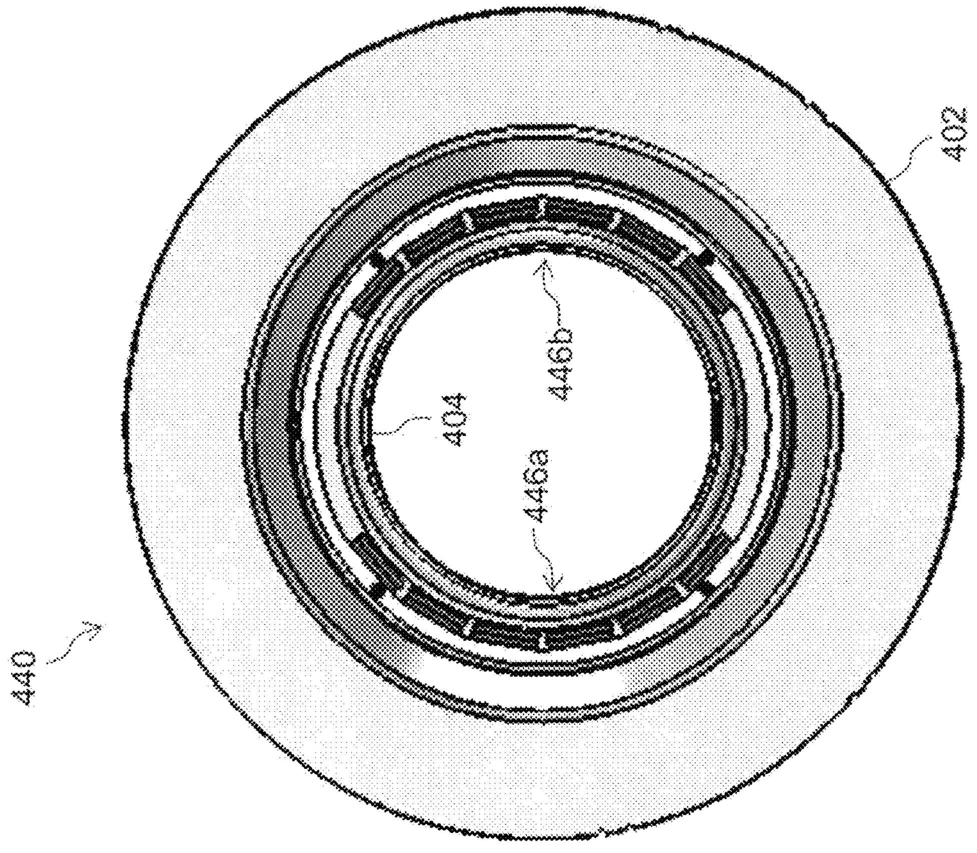
FIG. 4C is a front view of an electrode having a "left" configuration, according to some embodiments of the present disclosure.

Referring to FIG. 4C, an electrode 440 having an "left" configuration can include a first row of magnets **446*a* positioned along a left side of magnet assembly 404, and a second row of magnets 446*b* positioned along a right side of the magnet assembly 404. Each of the magnets in the first row 420*a* and the second row 420*b* may have a north pole facing right (relative to the page). In some embodiments, the first and second rows 446*a*, 446*b*** can each have six (6) magnets.

Referring to FIG. 4D, an electrode 460 having an "right" configuration may be similar to the "left" configuration of FIG. 4C, except that each of the magnets in a first row **466*a* and a second row 466*b*** may have a north pole facing left (relative to the page).

Figure 5:
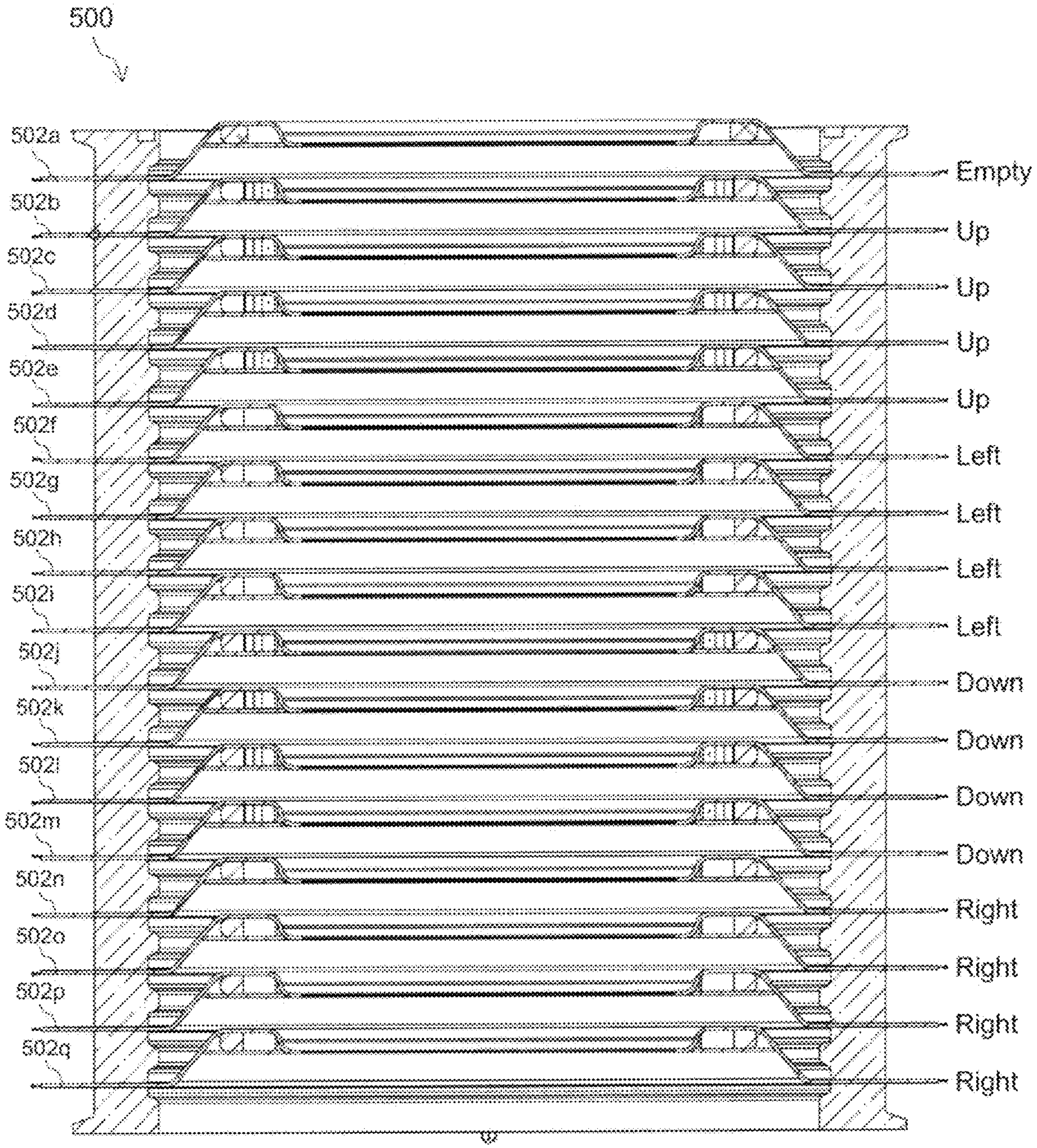
FIG. 5 is a front view of an acceleration tube segment having varying electrode configurations, according to some embodiments of the present disclosure.

FIG. 5 is a front view of an acceleration tube segment 500 having a plurality of electrodes **502*a*-502*q* (502 generally). The electrodes 502 may have varying configurations such that, when the tube segment 500 forms a part of an acceleration tube (e.g., tube 100 of FIG. 1), the electrodes 502 cause the ion beam to travel through the tube with little (or no) beam strike, while helping suppress unwanted electron flow in the reverse direction. For example, varying electrode configurations can be used to suppress secondary electrons in the tube. In the example shown, a first electrode 502*a* can have an "empty" configuration (e.g., an electrode with no magnets), electrodes 502*b*-502*e* can have an "up" configuration, electrodes 502*f*-502*i* can have a "down" configuration, electrodes 502*j*-502*m* can have a "left" configuration, and electrodes 502*n*-502*q*** can have a "right" configuration.

Figure 6:
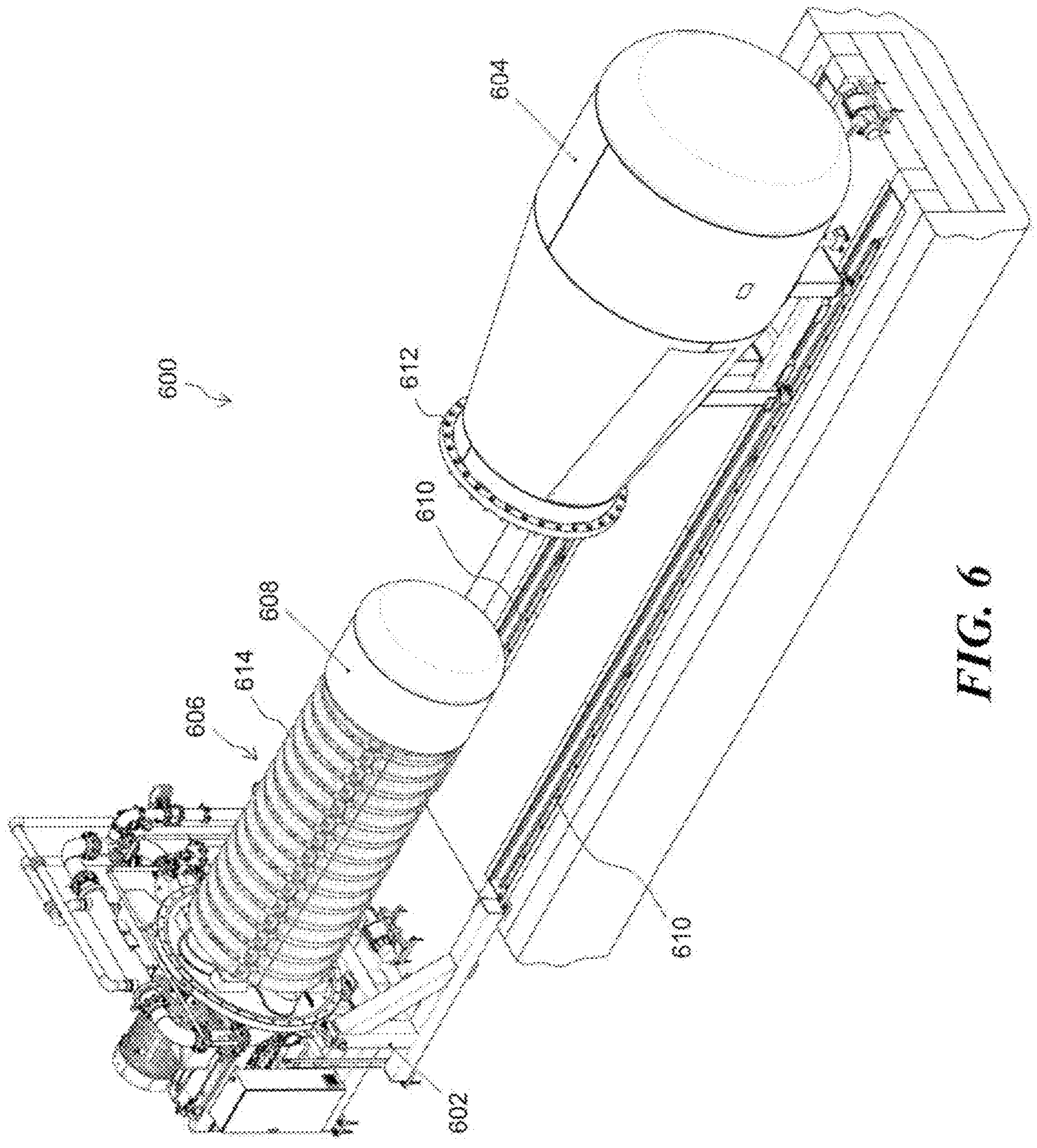
FIG. 6 is a perspective view of a compact insulated electrostatic particle accelerator, according to some embodiments of the present disclosure.

FIG. 6 shows a compact insulated electrostatic particle accelerator 600, according to some embodiments of the present disclosure. The accelerator 600 can include a motor and support assembly 602, a pressure vessel 604, an acceleration tube and power supplies assembly 606, and a terminal shell 608. The acceleration tube and power supplies assembly 606 may be fastened to the motor and support assembly 602 using nuts and bolts, or other suitable type of mechanical fasteners. The support assembly 602 (and attached acceleration tube assembly 606) may be configured to slide into the source chamber 604, for example using a rail system 610 as shown. The support assembly 602 and source chamber 604 can be mechanically fastened using nuts and bolts (e.g., bolts 612) or other suitable mechanical fasteners.

The acceleration tube and power supplies assembly 606 can include an acceleration tube (not visible in FIG. 6) and a plurality of stage assemblies 614 into which the tube can be positioned and supported. In some embodiments, the accelerator 600 can include two stage assemblies 614 for each tube segment. For example, the accelerator 600 can have seven (7) tube segments and fourteen (14) stage assemblies 614. A tube segment may be the same as or similar to tube segment 200 shown in FIG. 2 and described above in conjunction therewith. The acceleration tube and power supplies assembly 606 may include a drive shaft that extends substantially along the length of the tube and which is coupled to a plurality of alternators that power the tube electrodes. The drive shaft may be coupled to an electric motor within assembly 602. In some embodiments, high pressure sulfur hexafluoride (SF6) may be pumped into the pressure vessel to cool the acceleration tube 505, drive shaft, and alternators. In some embodiments, the drive shaft may be magnetically coupled to the motor so that the motor can remain external to the high pressure vessel 604.

Figure 7:
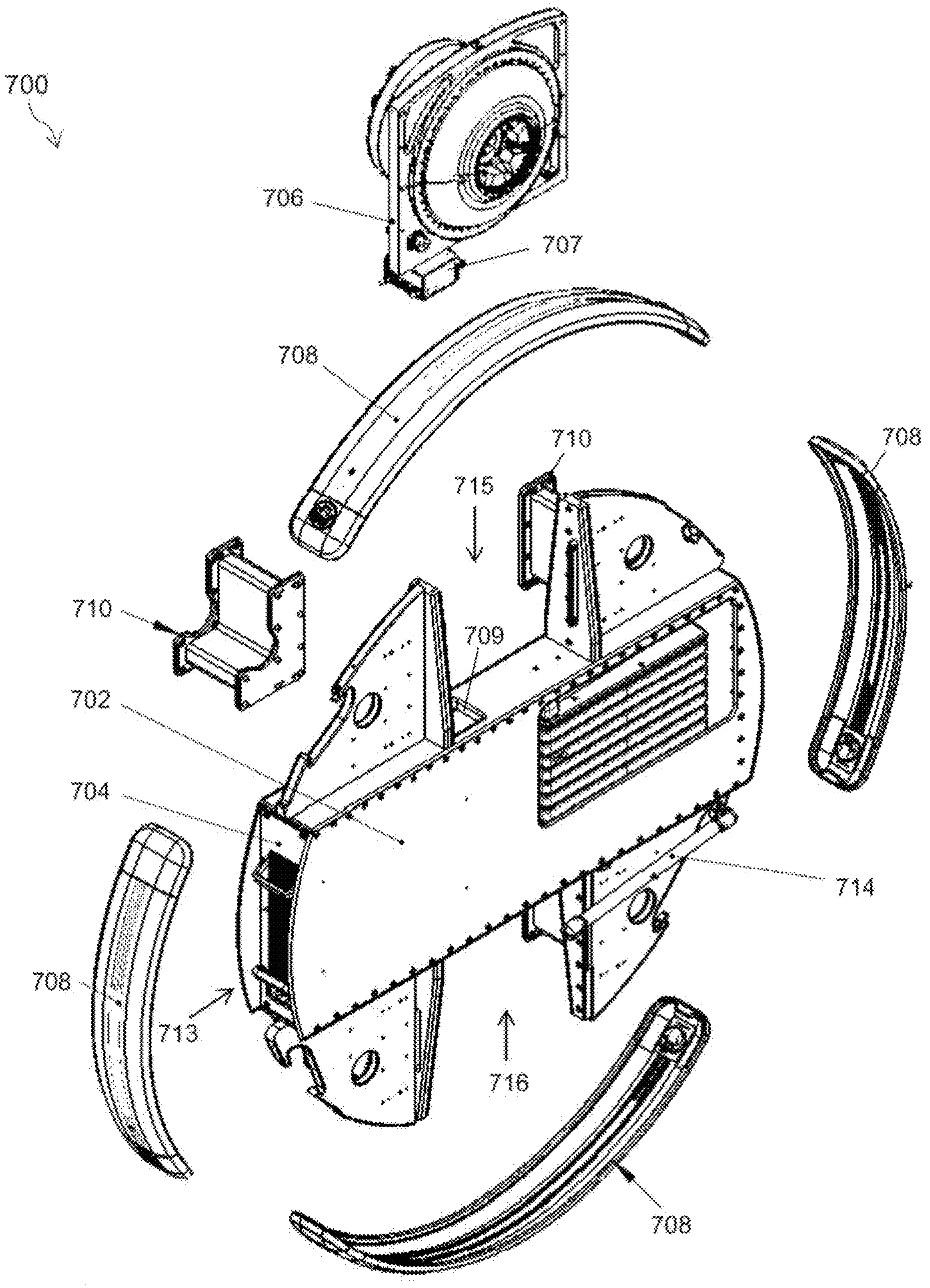
FIG. 7 is an exploded view of a stage assembly that may form part of the particle accelerator of FIG. 6, according to some embodiments of the present disclosure.
Figure 7B:
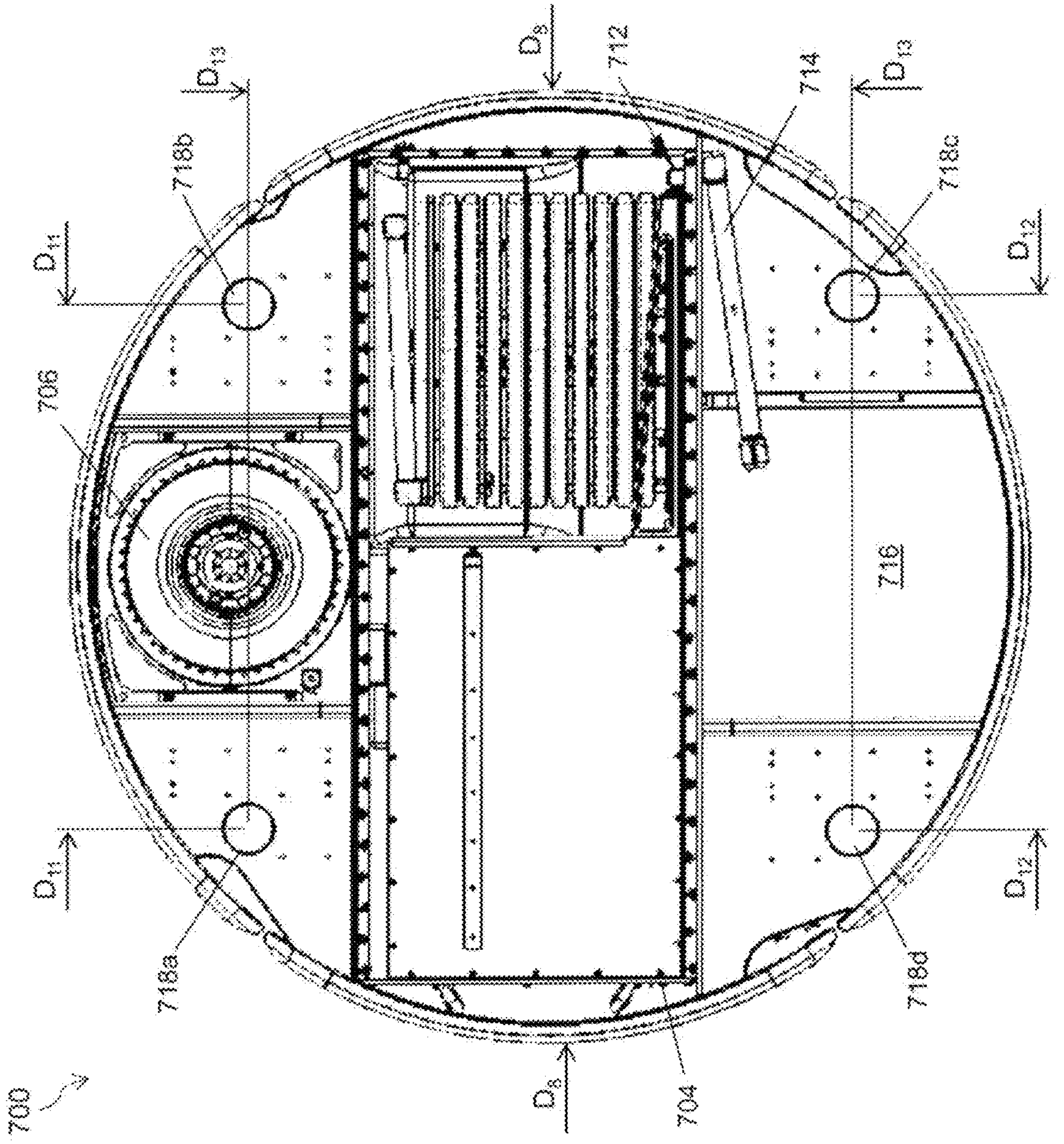
FIG. 7B is a front view of the stage assembly of FIG. 7, according to some embodiments of the present disclosure.
Figure 7A:
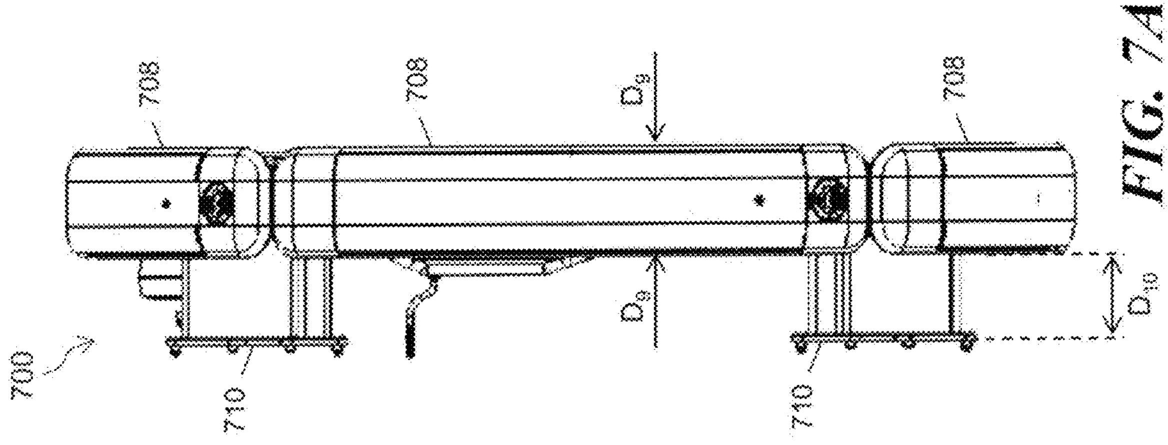
FIG. 7A is a side view of the stage assembly of FIG. 7, according to some embodiments of the present disclosure.

FIGS. 7, 7A, and 7B show a stage assembly 700, according to some embodiments of the present disclosure. The illustrative stage assembly 700, which can be the same as or similar to a stage assembly 614 shown in FIG. 6, may include a frame assembly 702, an electronics assembly or power supply 704, an alternator and insulator assembly 706, an equipotential ring assembly 708, insulator assemblies 710, a ground connector plug assembly 712 (shown in FIG. 7B), and a surge resistor assembly 714.

The electronics assembly 704 can be configured to slide into (and out of) the frame assembly 702 as indicated by arrow 713. The alternator and insulator assembly 706 can be configured to slide into (and out of) an opening 715 near the top of the stage assembly. The alternator and insulator assembly 706 may include a male connector 707 configured to couple with female connector 709 of the power supply 704. Thus, the stage assembly alternator and electronics can be electrically connected without the use of cables, improving serviceability.

The stage assembly may include an opening 716 near the bottom of the stage assembly 700 configured to receive or fit around the outer diameter of an acceleration tube (e.g., tube 100 in FIG. 1). This can allow the acceleration tube to be lifted or hoisted into place and then secured by the equipotential rings assembly 708.

The equipotential rings assembly 708 may include a plurality of segments (with four segments shown in this example) attached together using, for example, clasps or other type of quick release mechanical fasteners. The equipotential rings assembly 708 may create a continuous or nearly continuous enclosure around the electronics assembly 704, the alternator and insulator assembly 706, and acceleration tube opening 716.

In some embodiments, the stage assembly 700 can have a cylindrical shape with a diameter $D_8$. As shown in FIG. 7A, a thickness $D_{10}$ of the insulators may be selected to stand off electrical potential between adjacent stages. The insulator assemblies 710 can include alumina insulator and titanium end flanges, according to some embodiments. As shown in FIG. 7C, stage assembly 700 can include a plurality of holes 718*a*-718*d* through which tension rods (e.g., plastic tension rods) can be passed to keep ceramic parts under compression.

In some embodiments, stage assembly 700 and alternator 706 are configured so that the alternator can readily be slid in and out of the first opening 715, allowing for improved serviceability and maintenance. In some embodiments, alternator 706 can include integrated bearings and may have a "pancake" or axially compact geometry. In some embodiments, alternator 706 can be designed to withstand operating in a high pressure SF6 gas environment. In some embodiments, alternator 706 can be an axial flux alternator having integrated flex coupling with wrap-around carbon fiber brush grounding.

The alternator 706 may be mounted on a common drive shaft that is coupled to a motor. The alternator, drive shaft, motor, and couplings can be the same as or similar to embodiments disclosed in U.S. Pat. No. 8,558,486, issued on Oct. 15, 2013, herein incorporated by reference in its entirety.

Figure 8:
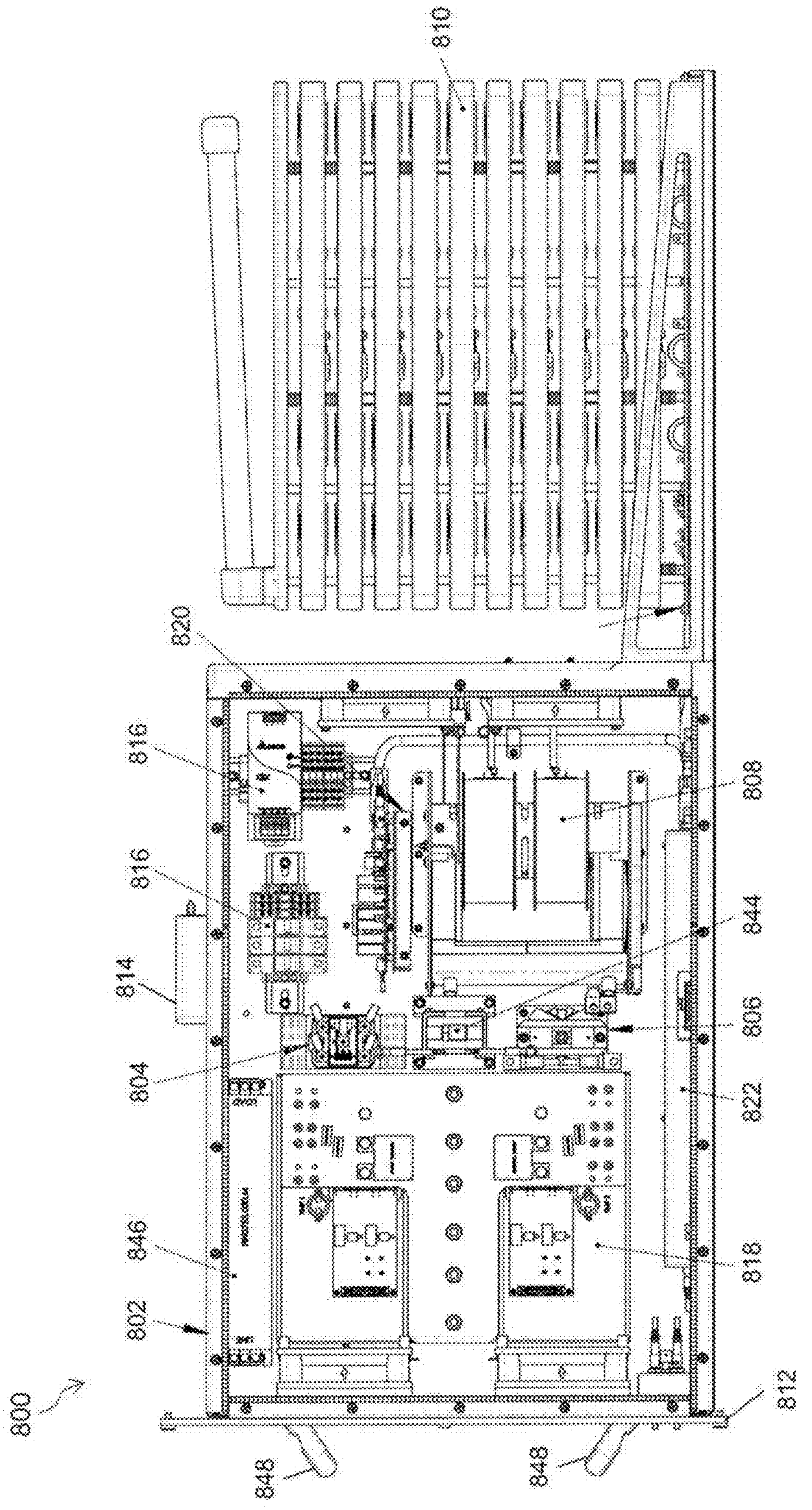
FIG. 8 is a side view of an electronics assembly that may form part of the stage assembly of FIG. 7, according to some embodiments of the present disclosure.
Figure 8A:
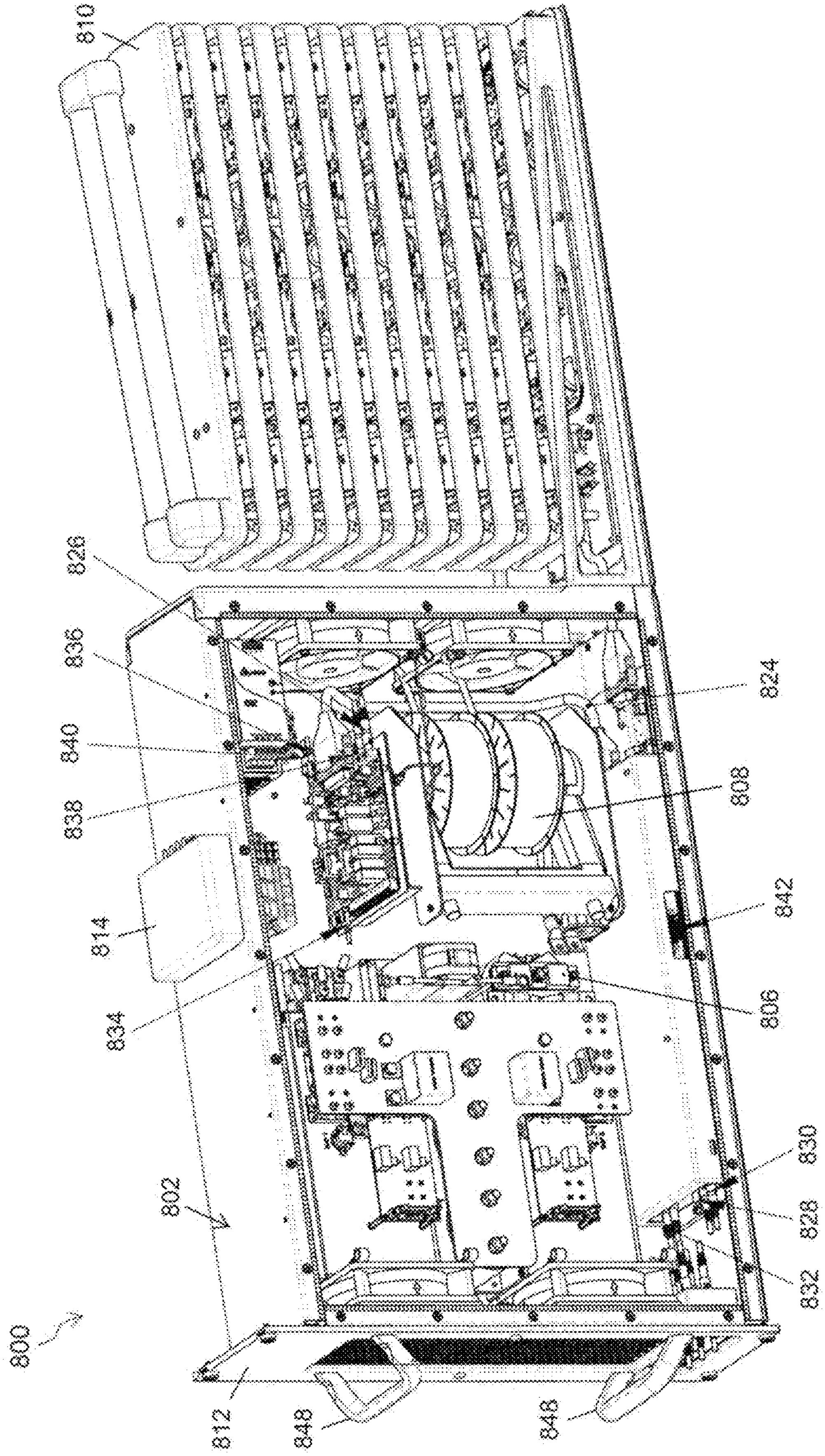
FIG. 8A is a perspective view of the stage electronics assembly of FIG. 8, according to some embodiments of the present disclosure.

FIGS. 8 and 8A show an electronics assembly or power supply 800, according to some embodiments of the present disclosure. The illustrative electronics assembly 800, which may be the same as or similar to electronics assembly 704 of FIGS. 7 and 7B, can include an enclosure 802, heatsink structures 804, an inductor assembly 806, a high-voltage transformer and fan assembly 808, a stack assembly 810, a front panel 812, a driver connector assembly 814, ground rail (or "DIN" rail) assemblies 816, a driver heatsink assembly 818, an alternator sense printed circuit board (PCB) assembly 820, a converter control board assembly 822, an alternator sense feedback cable assembly 824, an alternator sense fiber cable 826, a converter control PCB power cable 828, a converter control fiber cable 830, general purpose input/output (I/O) cables 832, an alternator sense PCB temperature cable 834, an alternator sense PCB power cable 836, a fans cable 838, a thermal snap switch cable 840, a control cable 842, a choke 844, and a filter 846. Stack assembly 810 can include a Cockcroft-Walton (CW) multiplier. Driver connector assembly 814 connects to the alternator to receive power and may include one or more diagnostic pins.

The electronics assembly 800 may have a "drawer"-style design including handles 848 attached to the front panel 812 to allow the assembly 800 to be easily slid in and out of an acceleration tube stage assembly (e.g., assembly 704 of FIG. 7B). In some embodiments, front panel 812 may also include switches to control the electronics within the assembly 800, and one or more lights or other diagnostic indicators for the electronics assembly 800.

Figure 9:
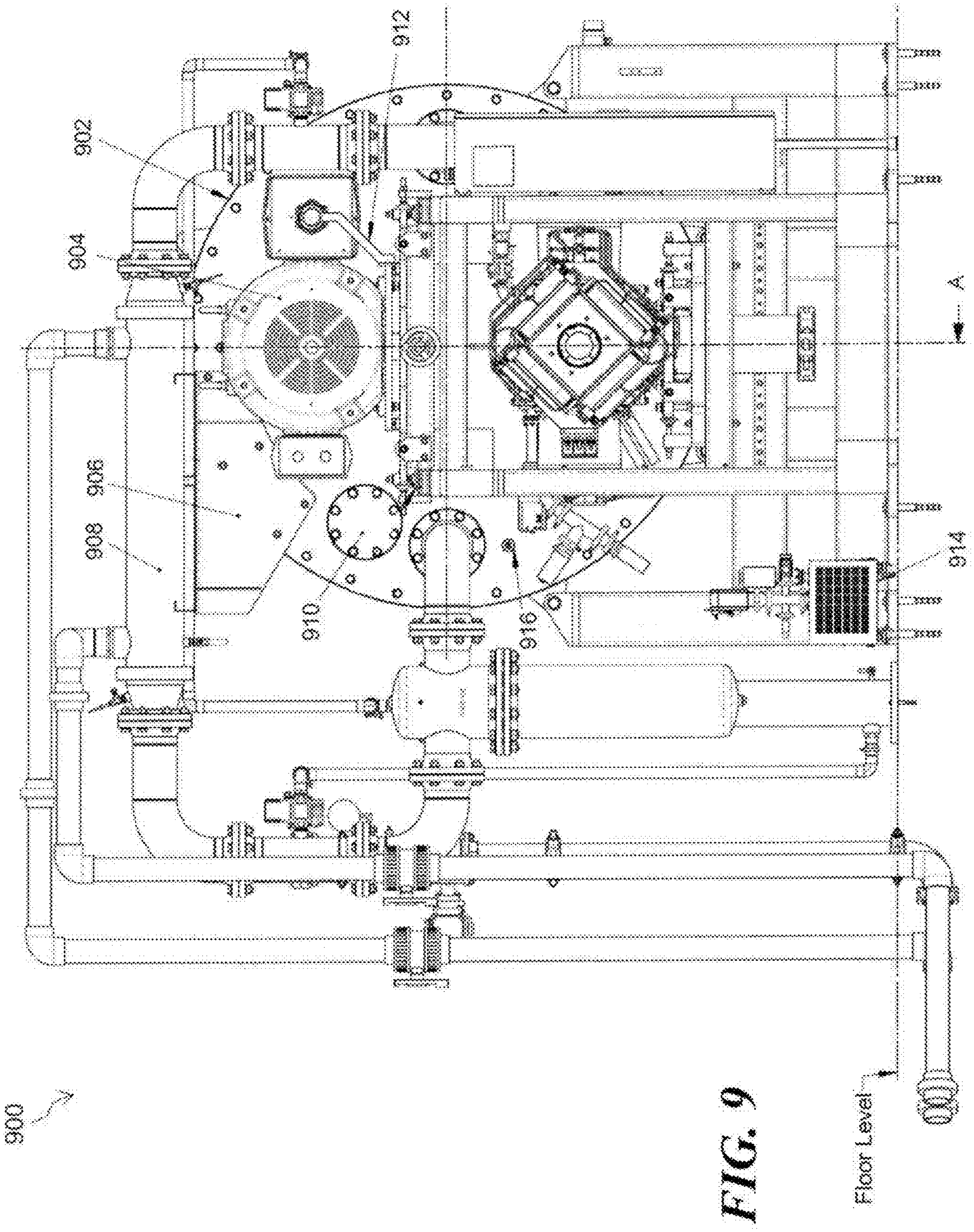
FIG. 9 is an end view of a motor and support assembly that may form part of a particle accelerator, according to some embodiments of the present disclosure.
Figure 9A:
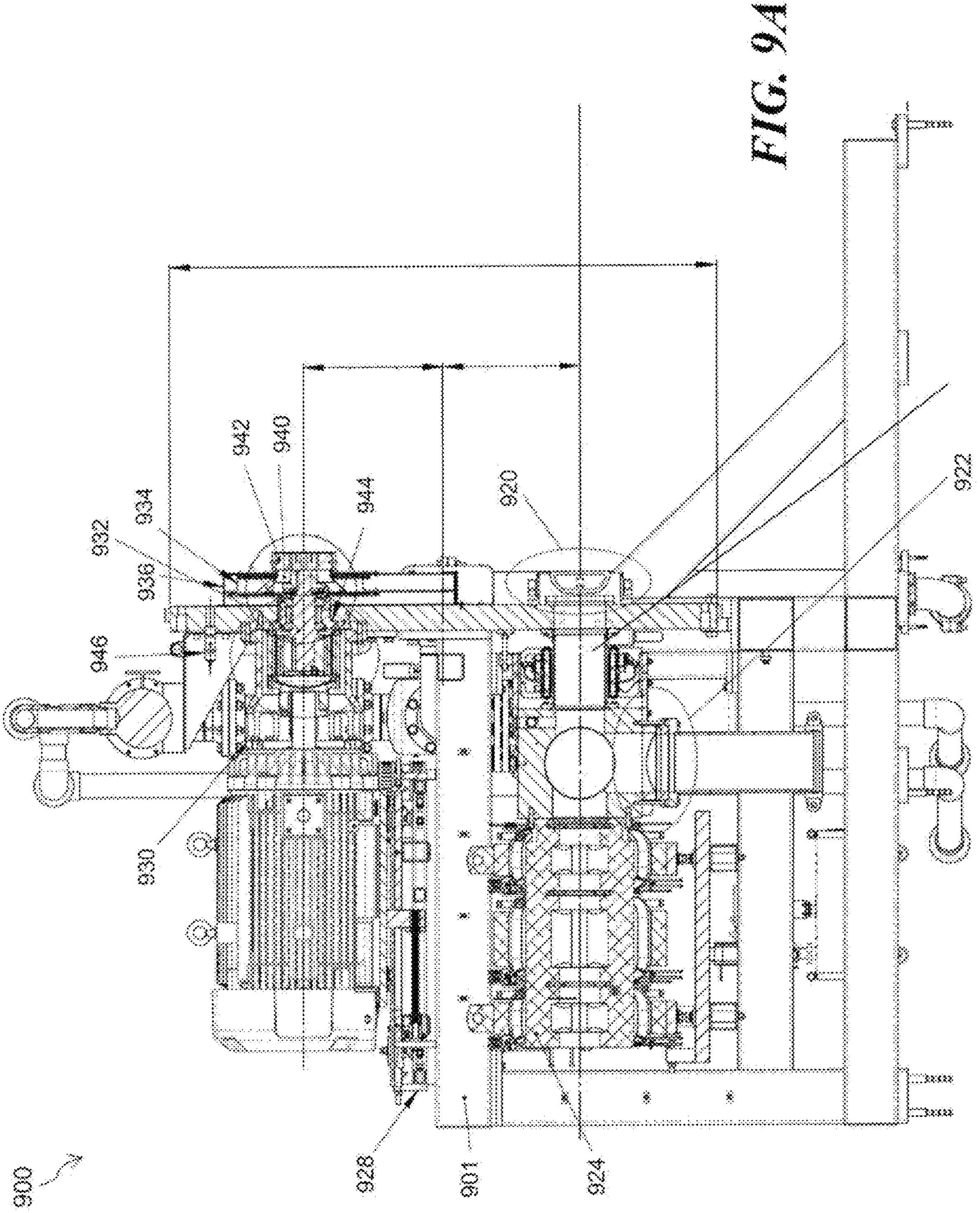
FIG. 9A is a cross sectional view of the motor and support assembly of FIG. 9, according to some embodiments of the present disclosure.
Figure 9B:
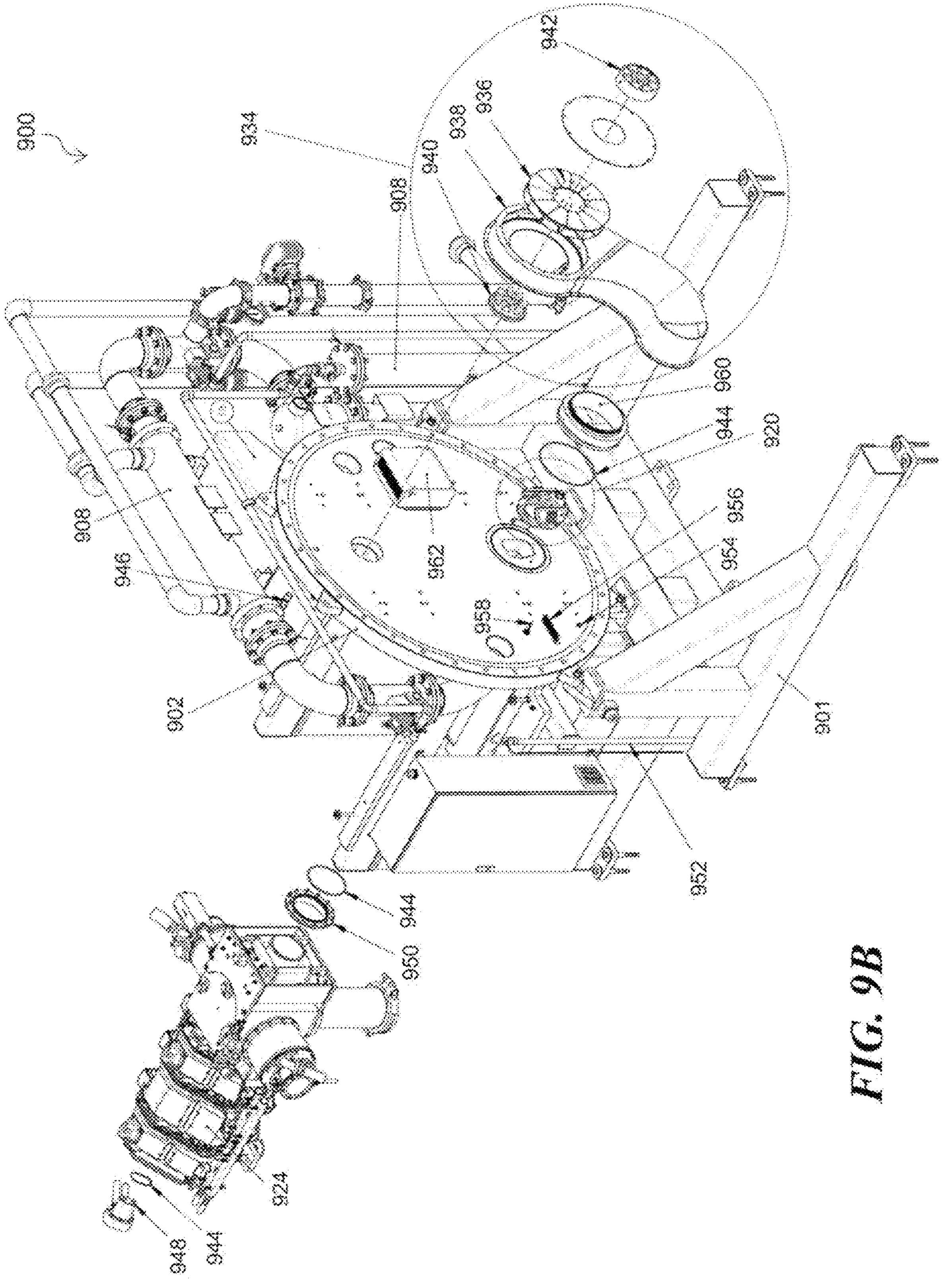
FIG. 9B is an exploded view of the motor and support assembly of FIG. 9, according to some embodiments of the present disclosure.
Figure 9B:
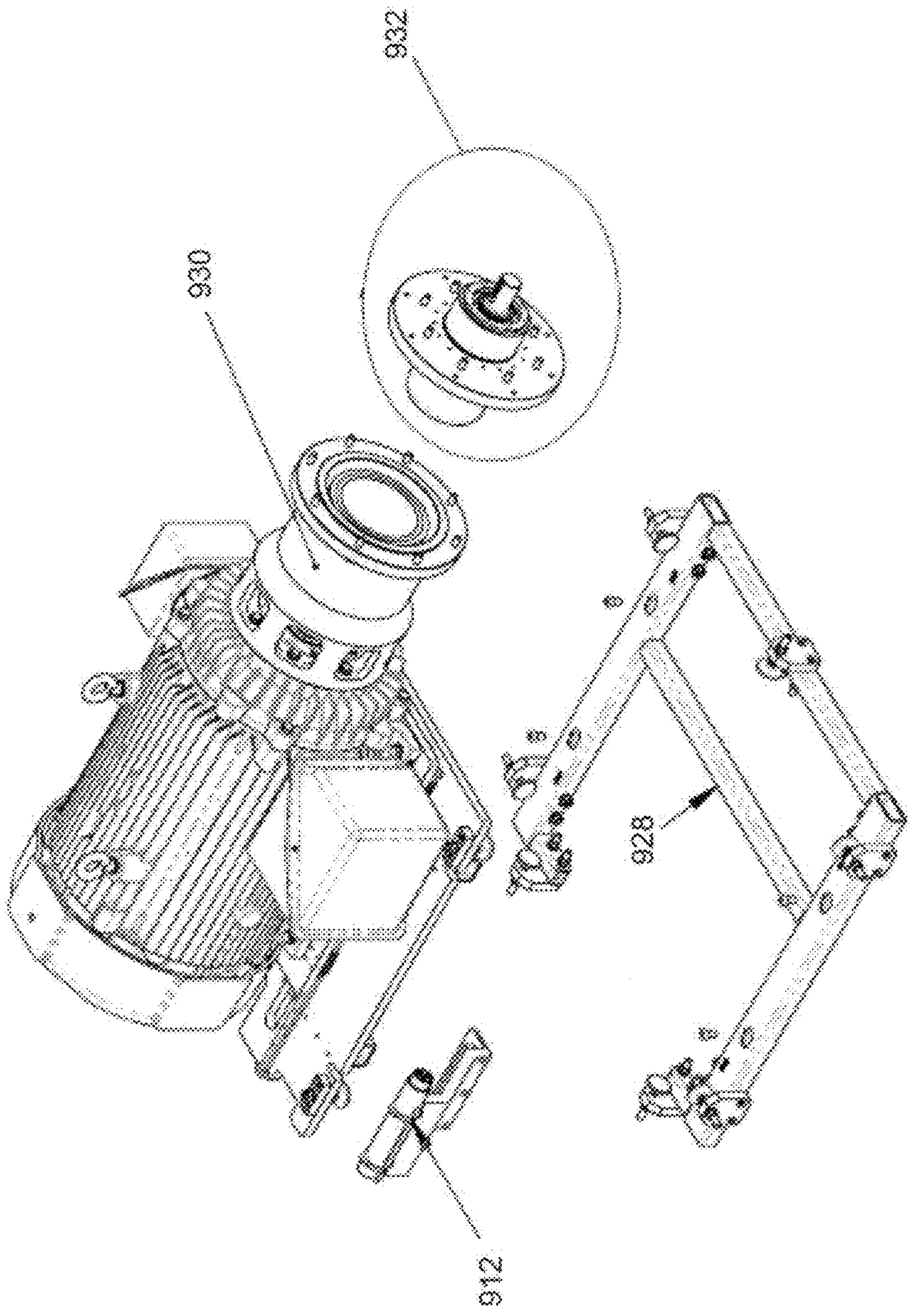

FIGS. 9, 9A, and 9B show a motor and support assembly 900, according to some embodiments of the present disclosure (with FIG. 9A showing a cross section of the assembly 900 taken across dashed line "A" of FIG. 9).

The illustrative assembly 900, which may be the same as or similar to assembly 602 of FIG. 6, can include: a terminal support frame assembly 901; a source chamber end flange assembly 902; a motor slide plate and magnetic coupling assembly 904; a heat exchanger support 906; a heat exchange, filter, and drier assembly 908; one or more flanges 910; a motor cable support assembly 912; a vacuum assembly (e.g., an assembly including a roughing pump and/or a turbo pump) 914; a communications port 916 (FIG. 9); a slam valve 920; a burst disk 922; a quadrupole, steerer coil and pumping box assembly 924; a motor support frame assembly 928; a motor, slide plate and magnetic coupling assembly 930; a feedthrough shaft and inner magnetic coupling assembly 932; a heat exchange impeller 934 mounted on the main drive shaft; a blower impeller assembly 936; an impeller shroud assembly 938; a power transmission coupling adapter assembly 940; a coupling element and cover 942; one or more O-rings 944; a safety valve 946; water feedthrough assembly 948; a muff coupling assembly 950; a hot stick assembly 952; a pressure vessel ground plug 954; a fiber optic bulkhead assembly 956; a fiber optic feedthrough assembly 958; a tube piston 960; and a ground suppression supply assembly 962.

Figure 10A:
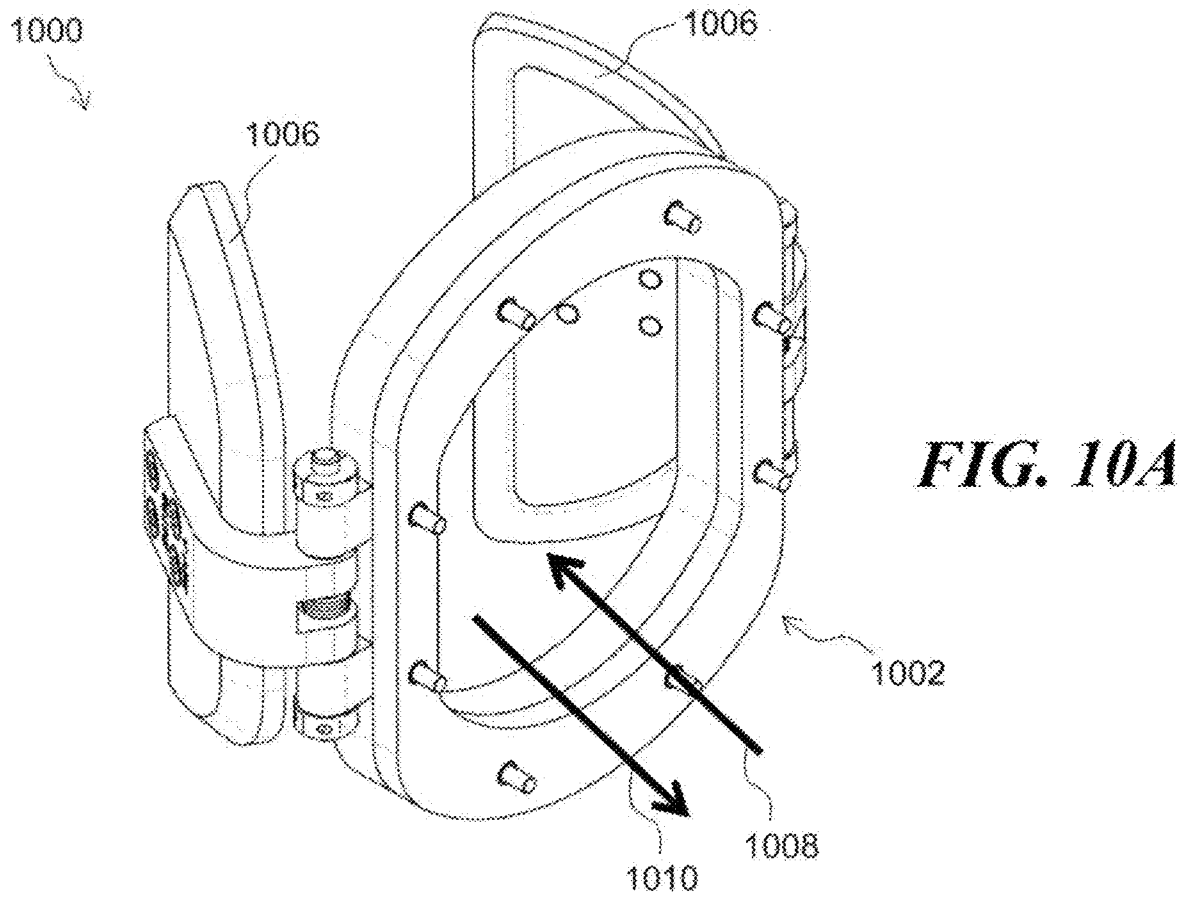
FIG. 10A is a perspective view showing a first (or "low pressure") side of a slam valve that may form part of a particle accelerator, according to some embodiments of the present disclosure.
Figure 10B:
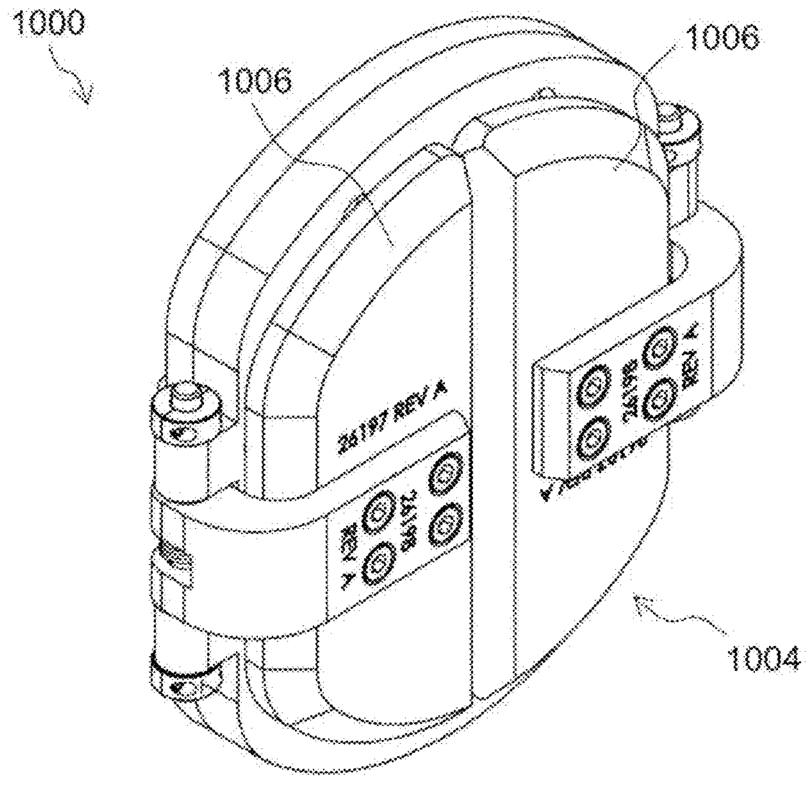
FIG. 10B is a perspective view showing a second (or "high pressure") side of the slam valve of FIG. 10A, according to some embodiments of the present disclosure.

The magnetic coupling assembly 932 can allow the motor to be located external to a high-pressure insulating pressure vessel in which an acceleration tube is located. High pressure gas may be pumped into a pressure vessel via the assembly 924. To prevent high pressure gas from rushing out of the pressure vessel and back into the motor and support assembly 900 (creating a safety hazard), the slam valve 920 and burst disk 922 may be provided. An example of a slam valve is shown in FIGS. 10A and 10B and discussed below in conjunction therewith. The burst disk 922 may include a reverse buckling rupture disk to maintain vacuum pressure (e.g., delta 15 psi) in one direction, but opens to a large diameter hole with a few psi in the other. The burst disk 922 can prevent overpressure inside the vacuum system.

The SF6 circulation system may include various components, such as impeller/blower assemblies 934, 936 (FIG. 9B) and pipework 908.

FIGS. 10A and 10B show a slam valve 1000, according to some embodiments of the present disclosure. The illustrative slam valve 1000 may be the same as or similar to slam valve 920 in FIGS. 9A and 9B. The slam valve 1000 can include a first (or "low pressure") side 1002, as shown in FIG. 10A, a second (or "high pressure") side 1004 of the slam valve, and doors 1006. The slam valve 1000 can be as a safety mechanism to permit high pressure gas from flowing in one direction while preventing it from flowing in the opposite direction. For example, when high pressure gas flows in a direction indicated by arrow 1008, the doors 1006 may open (or remain opened), permitting the flow. However, if high pressure flows in an opposite direction indicated by arrow 1010, then the doors 1006 may close or slam shut, preventing the flow. In some embodiments, the doors 1006 may be spring loaded to stay open under normal conditions. In in insulated particle accelerator, the slam valve 100 can be used prevent high pressure gas from rushing out of the tube.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. An electrostatic particle accelerator comprising:

an assembly comprising a motor and support plate;

an acceleration tube comprising:

an ion source, an extraction assembly, and a plurality of tube segments each comprising a plurality of electrodes and one or more power connectors attached to one of the electrodes;

one or more stage assemblies each comprising an alternator coupled to a common drive shaft, a power supply coupled to one of the plurality of electrodes, and an opening to receive a portion of the acceleration tube;

a pressure vessel configured to enclose the acceleration tube when the pressure vessel is fastened to the support plate; and a circulator configured to pump high pressure gas into the pressure vessel, wherein the motor is external to the pressure vessel and magnetically coupled to the common drive shaft.

2. The electrostatic particle accelerator of claim 1 wherein at least one of the tube segments comprises at least N electrodes and less than N stage assemblies.

3. The electrostatic particle accelerator of claim 1 wherein at least one of the tube segments comprises at least ten (10) electrodes and no more than two (2) stage assemblies.

4. The electrostatic particle accelerator of claim 1 wherein at least one of the stage assemblies comprises an axial flux alternator comprising integrated flex coupling with wraparound carbon fiber brush grounding.

5. The electrostatic particle accelerator of claim 1 wherein the acceleration tube comprises an extraction assembly powered by the common drive shaft.

6. The electrostatic particle accelerator of claim 1 wherein the circulator is powered by the common drive shaft.

7. The electrostatic particle accelerator of claim 6 wherein the circulator comprises a sulfur hexafluoride (SF6) circulator.

8. The electrostatic particle accelerator of claim 1 wherein at least one of the stage assemblies comprises a power supply that can be slide into the stage assembly and electrically connected to the stage assembly without using wires.

9. The electrostatic particle accelerator of claim 1 wherein at least one of the stage assemblies comprises an alternator and a power supply that can be electrically connected together without using cables.

10. The electrostatic particle accelerator of claim 1 wherein adjacent ones of the stage assemblies are connected together and spaced apart by insulators.

* * * * *